United States Patent
Onaka

(10) Patent No.: US 10,956,761 B2
(45) Date of Patent: Mar. 23, 2021

(54) CONTROL APPARATUS, CONTROL METHOD AGENT APPARATUS, AND COMPUTER READABLE STORAGE MEDIUM

(71) Applicant: HONDA MOTOR CO.,LTD., Tokyo (JP)

(72) Inventor: Junichiro Onaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/677,664

(22) Filed: Nov. 8, 2019

(65) Prior Publication Data
US 2020/0151477 A1 May 14, 2020

(30) Foreign Application Priority Data

Nov. 14, 2018 (JP) .............................. JP2018-213911

(51) Int. Cl.
| | |
|---|---|
| *G06K 9/00* | (2006.01) |
| *B60R 16/037* | (2006.01) |
| *B60R 16/023* | (2006.01) |
| *H04W 4/40* | (2018.01) |
| *G10L 15/22* | (2006.01) |
| *G06F 3/01* | (2006.01) |

(52) U.S. Cl.
CPC ...... *G06K 9/00845* (2013.01); *B60R 16/0232* (2013.01); *B60R 16/0373* (2013.01); *G06F 3/017* (2013.01); *G10L 15/22* (2013.01); *H04W 4/40* (2018.02); *G10L 2015/223* (2013.01); *G10L 2015/227* (2013.01)

(58) Field of Classification Search
CPC . G06K 9/00845; H04W 4/40; B60R 16/0232; B60R 16/0373; G06F 3/017; G10L 15/22; G10L 2015/223; G10L 2015/227
See application file for complete search history.

(56) References Cited

U.S. PATENT DOCUMENTS

| | | | |
|---|---|---|---|
| 2004/0010599 A1* | 1/2004 | Otobe | H04N 21/25883 709/228 |
| 2016/0104486 A1* | 4/2016 | Penilla | G10L 15/005 704/232 |
| 2020/0062237 A1* | 2/2020 | Ayesh | B60W 20/17 |

FOREIGN PATENT DOCUMENTS

| | | | |
|---|---|---|---|
| JP | 2000020888 A | | 1/2000 |
| JP | 2006189394 A | | 7/2006 |
| JP | 2006189394 A | * | 7/2006 |

* cited by examiner

*Primary Examiner* — Sm A Rahman

(57) ABSTRACT

A control apparatus controls an agent apparatus functioning as a user interface of a request processing apparatus that acquires a request indicated by at least one of a voice and a gesture of a user and performs a process corresponding to the request. The control apparatus includes a transmission event detecting section that detects an occurrence of an event necessitating transmission of a message to a communication terminal of the user, and a transmission determining section that makes a determination to transmit a voice message to the communication terminal of the user, via a communication network, if an occurrence of the event is detected.

7 Claims, 13 Drawing Sheets

CONTROL APPARATUS, CONTROL METHOD AGENT APPARATUS, AND COMPUTER READABLE STORAGE MEDIUM

CROSS REFERENCE TO RELATED APPLICATION

The contents of the following Japanese patent application are incorporated herein by reference:
NO. 2018-213911 filed in JP on Nov. 14, 2018.

BACKGROUND

1. Technical Field

The present invention relates to a control apparatus, a control method, an agent apparatus, and a computer readable storage medium.

2. Related Art

An agent apparatus is known that performs various processes based on an interaction with a user via an anthropomorphic agent, as shown in Patent Documents 1 and 2, for example.
Patent Document 1: Japanese Patent Application Publication No. 2006-189394
Patent Document 2: Japanese Patent Application Publication No. 2000-020888
The summary clause does not necessarily describe all necessary features of the embodiments of the present invention. The present invention may also be a sub-combination of the features described above.

DESCRIPTION OF EXEMPLARY EMBODIMENTS

Figure 1:
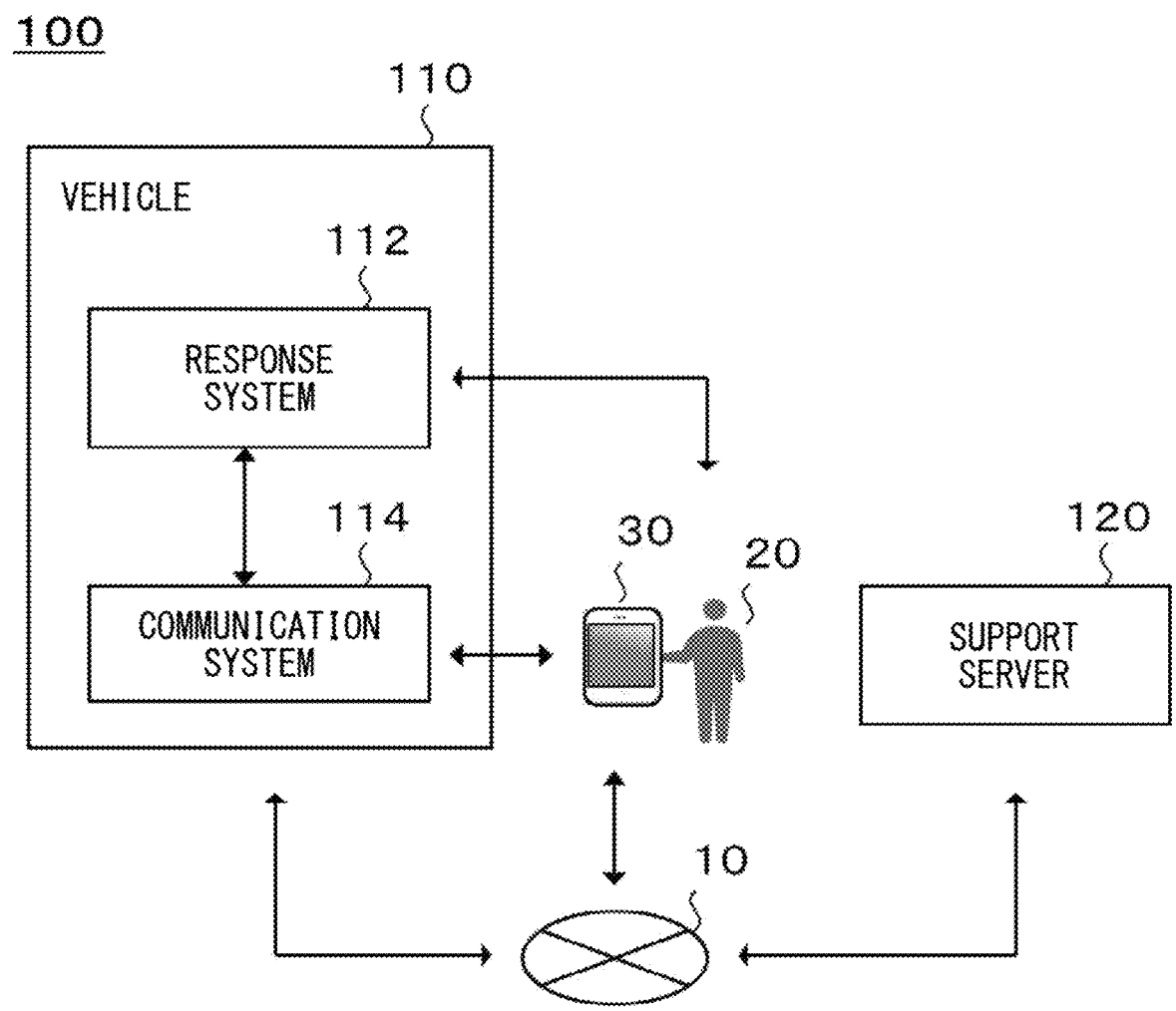
FIG. 1 schematically shows an example of a system configuration of an interactive agent system 100.

Hereinafter, some embodiments of the present invention will be described. The embodiments do not limit the invention according to the claims, and all the combinations of the features described in the embodiments are not necessarily essential to means provided by modes of the invention. In the drawings, identical or similar portions may be given the same reference numerals, and redundant descriptions may be omitted.

[Outline of an Interactive Agent System 100]

FIG. 1 schematically shows an example of a system configuration of an interactive agent system 100. In the present embodiment, the interactive agent system 100 includes a vehicle 110 and a support server 120. In the present embodiment, the vehicle 110 includes a response system 112 and a communication system 114.

The interactive agent system 100 may be an example of a request processing apparatus. The vehicle 110 or an information output device mounted in the vehicle 110 may be an example of an agent apparatus. The response system 112 may be an example of an agent apparatus. The support server 120 may be an example of a relay apparatus.

In the present embodiment, the vehicle 110 and the support server 120 can transmit and receive information to and from each other via a communication network 10. Furthermore, the vehicle 110 and a communication terminal 30 used by a user 20 of the vehicle 110 may transmit and receive information to and from each other via the communication network 10, or the support server 120 and the communication terminal 30 may transmit and receive information to and from each other via the communication network 10.

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a specialized network, a VPN, a power line communication network, or the like. The communication network 10 may include (i) a moving body communication network such as a mobile telephone network, (ii) a wireless communication network such as wireless MAN (e.g. WiMAX (registered trademark)), wireless LAN (e.g. WiFi (registered trademark)), Bluetooth (registered trademark), Zigbee (registered trademark), or NFC (Near Field Communication).

In the present embodiment, the user 20 may be a user of the vehicle 110. The user 20 may be the driver of the vehicle 110, or may be a passenger riding with this driver. The user 20 may be the owner of the vehicle 110, or may be an occupant of the vehicle 110. The occupant of the vehicle 110 may be a user of a rental service or sharing service of the vehicle 110.

In the present embodiment, the communication terminal 30 need only be able to transmit and receive information to and from at least one of the vehicle 110 and the support server 120, and the details of this are not particularly limited. Examples of the communication terminal 30 include a personal computer, a portable terminal, and the like. Examples of the portable terminal include a mobile telephone, a smartphone, a PDA, a tablet, a notebook computer or laptop computer, a wearable computer, and the like.

The communication terminal 30 may correspond to one or more communication systems. Examples of the communication system include a moving body communication system, a wireless MAN system, a wireless LAN system, a wireless PAN system, and the like. Examples of the moving body communication system include a GSM (registered trademark) system, a 3G system, an LTE system, a 4G system, a 5G system, and the like. Examples of the wireless MAN system include WiMAX (registered trademark). Examples of the wireless LAN system include WiFi (registered trademark). Examples of the wireless PAN system include Bluetooth (registered trademark), Zigbee (registered trademark), NFC (Near Field Communication), and the like.

In the present embodiment, the interactive agent system 100 acquires a request indicated by at least one of a voice or a gesture of the user 20, and executes a process corresponding to this request. Examples of the gesture include shaking the body, shaking a hand, behavior, face direction, gaze direction, facial expression, and the like. Furthermore, the interactive agent system 100 transmits the results of the above process to the user 20. The interactive agent system 100 may perform the acquisition of the request and transmission of the results described above via interactive instructions between the user 20 and an agent functioning as a user interface of the interactive agent system 100.

The agent is used to transmit information to the user 20. Not only linguistic information, but also non-linguistic information, can be transmitted through the interaction between the user 20 and the agent. Therefore, it is possible to realize smoother information transmission. The agent may be a software agent, or may be a hardware agent. There are cases where the agent is referred to as an AI assistant.

The software agent may be an anthropomorphic agent realized by a computer. This computer may be a computer mounted in at least one of the communication terminal 30 and the vehicle 110. The anthropomorphic agent is displayed or projected on a display apparatus or projection apparatus of a computer, for example, and is capable of communicating with the user 20. The anthropomorphic agent may communicate with the user 20 by voice. The hardware agent may be a robot. The robot may be a humanoid robot, or a robot in the form of a pet.

The agent may have a face. The "face" may include not only a human or animal face, but also objects equivalent to a face. Objects equivalent to a face may be objects having the same functions as a face. Examples of the functions of a face include a function for communicating an emotion, a function for indicating a gaze point, and the like.

The agent may include eyes. The eyes include not only human or animal eyes, but also objects equivalent to eyes. Objects equivalent to eyes may be objects having the same functions as eyes. Examples of the functions of eyes include a function for communicating an emotion, a function for indicating a gaze point, and the like.

Here, "interaction" may include not only communication through linguistic information, but also communication through non-linguistic information. Examples of communication through linguistic information include (i) conversation, (ii) sign language, (iii) signals or signal sounds for which a gesture and the content to be communicated by this gesture are predefined, and the like. Examples of the communication through non-linguistic information include shaking the body, shaking a hand, behavior, face direction, gaze direction, facial expression, and the like.

In the present embodiment, the interactive agent system 100 responds to a request of the user 20 by using an interaction engine (not shown in the drawings, and sometimes referred to as a cloud interaction engine) implemented in the support server 120. In the present embodiment, the interactive agent system 100 may include an interaction engine (not shown in the drawings, and sometimes referred to as a local interaction engine) implemented in the response system 112 and the cloud interaction engine implemented in the support server 120.

The local interaction engine and the cloud interaction engine may be physically different interaction engines. The local interaction engine and the cloud interaction engine may be interaction engines with different capabilities. In one embodiment, the number of types of requests that can be recognized by the local interaction engine is less than the number of types of requests that can be recognized by the cloud interaction engine. In another embodiment, the number of types of requests that can be processed by the local interaction engine is less than the number of types of requests that can be processes by the cloud interaction engine.

The interactive agent system 100 determines which of the local interaction engine and the cloud interaction engine to use based on a communication state between the vehicle 110 and the support server 120. For example, in a case where the communication state is relatively good, the interactive agent system 100 responds to the request of the user 20 using the cloud interaction engine. On the other hand, if the communication state is relatively poor, the interactive agent system 100 may respond to the request of the user 20 using the local interaction engine. In this way, it is possible to switch between the local interaction engine and the cloud interaction engine according to the communication state between the vehicle 110 and the support server 120.

The interactive agent system 100 may determine a mode of the agent based on a state of the response system 112. In this way, the mode of the agent can be switched according to the state of the response system 112. Examples of the state of the response system 112 include (i) a state in which the response system 112 is stopped (sometimes referred to as the OFF state), (ii) a state in which the response system 112 is operating (sometimes referred to as the ON state) and waiting (sometimes referred to as the standby state) to receive a request (sometimes referred to as an activation request) for staring the response process by the interaction engine, and (iii) a state where the response system 112 is in the ON state and executing the response process with the interaction engine (sometimes referred to as the active state).

The standby state may be a state for receiving an activation request and executing this activation request. The active state may be a state for processing a request other than the activation request, via the agent.

The activation request may be a request for activating the agent, a request for starting the response process via the agent, or a request for activating or enabling the voice recognition function or the gesture recognition function of the interaction engine. The activation request may be a request for changing the state of the response system 112 from the standby state to the active state. There are cases where the activation request is referred to as an activation word, trigger phrase, or the like. The activation request is not limited to a voice. The activation request may be a predetermined gesture or may be a manipulation made to input the activation request.

At least one state of the response system 112 described above may be further refined. For example, the state in which the response process is executed by the interaction engine can be refined into a state in which the request of the user 20 is processed by the local interaction engine and a state in which the request of the user 20 is processed by the cloud interaction engine. In this way, as an example, the interactive agent system 100 can switch the mode of the agent between a case in which the local interaction engine processes the request of the user 20 and a case in which the cloud interaction engine processes the request of the user 20.

Examples of modes of the agent include at least one of the type of character used as the agent, the appearance of this character, the voice of this character, and the mode of interaction. Examples of the character include a character modeled on an actual person, animal, or object, a character modeled on a historic person, animal, or object, a character modeled on a fictional or imaginary person, animal, or object, and the like. The object may be a tangible object or an intangible object. The character may be a character modeled on a portion of the people, animals, or objects described above.

Examples of the appearance include at least one of (i) a form, pattern, color, or combination thereof, (ii) technique and degree of deformation, exaggeration, or alteration, and (iii) image style. Examples of the form include at least one of figure, hairstyle, clothing, accessories, facial expression, and posture. Examples of the deformation techniques include head-to-body ratio change, parts placement change, parts simplification, and the like. Examples of image styles include entire image color, touches, and the like. Examples of touches include photorealistic touches, illustration style touches, cartoon style touches, American comic style touches, Japanese comic style touches, serious touches, comedy style touches, and the like.

As an example, there are cases where the same character can have a different appearance due to age. The appearance of a character may differ between at least two of childhood, adolescence, young adulthood, middle age, old age, and twilight years. There are cases were the same character can have a different appearance as the degree of deformation progresses. For example, when two images of a character with the same appearance but different head-to-body ratios are compared to each other, the character in the image with the greater head-to-body ratio appears younger than the character in the image with the smaller head-to-body ratio.

Examples of the voice include at least one of voice quality, voice tone, and voice height (sometimes called pitch). Examples of the modes of interactions include at least one of the manner of speech and gesturing when responding. Examples of the manner of speech include at least one of voice volume, tone, tempo, length of each utterance, pauses, inflections, emphasis, how back-and-forth happens, habits, and how topics are developed. Specific examples of the manner of speech in a case where the interaction between the user 20 and the agent is realized through sign language may be the same as the specific examples of the manner of speech in a case where the interaction between the user 20 and the agent is realized through speech.

In the present embodiment, the details of the interactive agent system 100 are described using an example of a case in which the response system 112 is an interactive vehicle driving support apparatus implemented in the vehicle 110. However, the interactive agent system 100 is not limited to the present embodiment. In another embodiment, the device in which the response system 112 is implemented is not limited to a vehicle. The response system 112 may be implemented in a stationary device, a mobile device (sometimes referred to as a moving body), or a portable or transportable device. The response system 112 is preferably implemented in a device that has a function for outputting information and a communication function. For example, the response system 112 can be implemented in the communication terminal 30. The device in which the response system 112 is implemented may be an example of the agent apparatus, a control apparatus, and the request processing apparatus.

Examples of the stationary device include electronic appliances such as a desktop PC, a television, speakers, and a refrigerator. Examples of the mobile device include a vehicle, a work machine, a ship, and a flying object. Examples of the portable or transportable device include a mobile telephone, a smartphone, a PDA, a tablet, a notebook computer or laptop computer, a wearable computer, a mobile battery, and the like.

[Outline of Each Section of the Interactive Agent System 100]

In the present embodiment, the vehicle 110 is used to move the user 20. Examples of the vehicle 110 include an automobile, a motorcycle, and the like. Examples of a motorcycle include (i) a motorbike, (ii), a three-wheeled motorcycle, (iii) a standing motorcycle including a power unit, such as a Segway (registered trademark), a kickboard (registered trademark) with a power unit, a skateboard with a power unit, and the like.

In the present embodiment, the response system 112 acquires a request indicated by at least one of the voice and a gesture of the user 20. The response system 112 executes a process corresponding to this request. Furthermore, the response system 112 transmits the result of this process to the user 20.

In one embodiment, the response system 112 acquires (i) a request input by the user 20 to the device mounted in the vehicle 110 or (ii) a request input by the user 20 to the device mounted in the communication terminal 30. The response system 112 may acquire, via the communication system 114, the request input by the user 20 to the device mounted in the communication terminal 30. The response system 112 may provide the user 20 with the response to this request via an information input/output device mounted in the vehicle 110.

In another embodiment, the response system 112 acquires (i) a request input by the user 20 to the device mounted in the vehicle 110 or (ii) a request input by the user 20 to the device mounted in the communication terminal 30. The response system 112 may acquire, via the communication system 114, the request input by the user 20 to the device mounted in the communication terminal 30. The response system 112 transmits the response to this request to the communication terminal 30, via the communication system 114. The communication terminal 30 provides the user 20 with the information acquired from the response system 112.

The response system 112 may use at least one of the local interaction engine and the cloud interaction engine to respond to the request from the user 20. The response system 112 may determine whether to use the local interaction engine or the cloud interaction engine to respond to the request. For example, the response system 112 may determine whether to use the local interaction engine or the cloud interaction engine to respond to the request based on the communication state between the vehicle 110 and the support server 120.

The response system 112 may function as a user interface of the local interaction engine. The response system 112 may function as a user interface of the cloud interaction engine.

In the present embodiment, the communication system 114 communicates information between the vehicle 110 and the support server 120, via the communication network 10. The communication system 114 may communicate information between the vehicle 110 and the communication terminal 30 using wired communication or short-range wireless communication.

As an example, the communication system 114 transmits to the support server 120 information concerning the user 20 acquired by the response system 112 from the user 20. The communication system 114 may transmit, to the support server 120, information concerning the user 20 acquired by the communication terminal 30 from the user 20. The communication system 114 may acquire information concerning the vehicle 110 from the device mounted in the vehicle 110, and transmit the information concerning the vehicle 110 to the support server 120. The communication system 114 may acquire information concerning the communication terminal 30 from the communication terminal 30, and transmit the information concerning the communication terminal 30 to the support server 120.

Furthermore, the communication system 114 receives, from the support server 120, information output by the cloud interaction engine. The communication system 114 transmits, to the response system 112, the information output by the cloud interaction engine. The communication system 114 may transmit the information output by the response system 112 to the communication terminal 30.

In the present embodiment, the support server 120 executes a program causing a computer of the support server 120 to function as the cloud interaction engine. In this way, the cloud interaction engine operates on the support server 120.

In the present embodiment, the support server 120 acquires a request indicated by at least one of the voice and a gesture of the user 20, via the communication network 10. The support server 120 executes a program corresponding to this request. Furthermore, the support server 120 notifies the response system 112 about the results of this process, via the communication network 10.

[Detailed Configuration of Each Section of the Interactive Agent System 100]

Each section of the interactive agent system 100 may be realized by hardware, by software, or by both hardware and software. At least part of each section of the interactive agent system 100 may be realized by a single server or by a plurality of servers. At least part of each section of the interactive agent system 100 may be realized on a virtual server or a cloud system. At least part of each section of the interactive agent system 100 may be realized by a personal computer or a mobile terminal. The mobile terminal can be exemplified by a mobile telephone, a smart phone, a PDA, a tablet, a notebook computer, a laptop computer, a wearable computer, or the like. Each section of the interactive agent system 100 may store information, using a distributed network or distributed ledger technology such as block chain.

If at least some of the components forming the interactive agent system 100 are realized by software, these components realized by software may be realized by starting up programs in which operations corresponding to these components are defined, with an information processing apparatus having a general configuration. The information processing apparatus having the general configuration described above may include (i) a data processing apparatus having a processor such as a CPU or a GPU, a ROM, a RAM, a communication interface, and the like, (ii) an input apparatus such as a keyboard, a touch panel, a camera, a microphone, various sensors, or a GPS receiver, (iii) an output apparatus such as a display apparatus, an voice output apparatus, or a vibration apparatus, and (iv) a storage apparatus (including an external storage apparatus) such as a memory or an HDD.

In the information processing apparatus having the general configuration described above, the data processing apparatus or the storage apparatus described above may store the programs described above. The programs described above may be stored in a non-transitory computer readable storage medium. The programs described above cause the information processing apparatus described above to perform the operations defined by these programs, by being executed by the processor.

The programs may be stored in a computer readable medium such as a CD-ROM, a DVD-ROM, a memory, or a hard disk, or may be stored in a storage apparatus connected to a network. The programs described above may be installed in the computer forming at least part of the interactive agent system 100, from the computer readable medium or the storage apparatus connected to the network. The computer may be caused to function as at least a portion of each section of the interactive agent system 100, by executing the programs described above.

The programs that cause the computer to function as at least some of the sections of the interactive agent system 100 may include modules in which the operations of the sections of the interactive agent system 100 are defined. These programs and modules act on the data processing apparatus, the input apparatus, the output apparatus, the storage apparatus, and the like to cause the computer to function as each section of the interactive agent system 100 and to cause the computer to perform the information processing method in each section of the interactive agent system 100.

By having the computer read the programs described above, the information processes recorded in these programs function as the specific means realized by the cooperation of software relating to these programs and various hardware resources of some or all of the interactive agent system 100. These specific means realize computation or processing of the information corresponding to an intended use of the computer in the present embodiment, thereby forming the interactive agent system 100 corresponding to this intended use.

[Outline of Each Section of the Vehicle 110]

Figure 2:
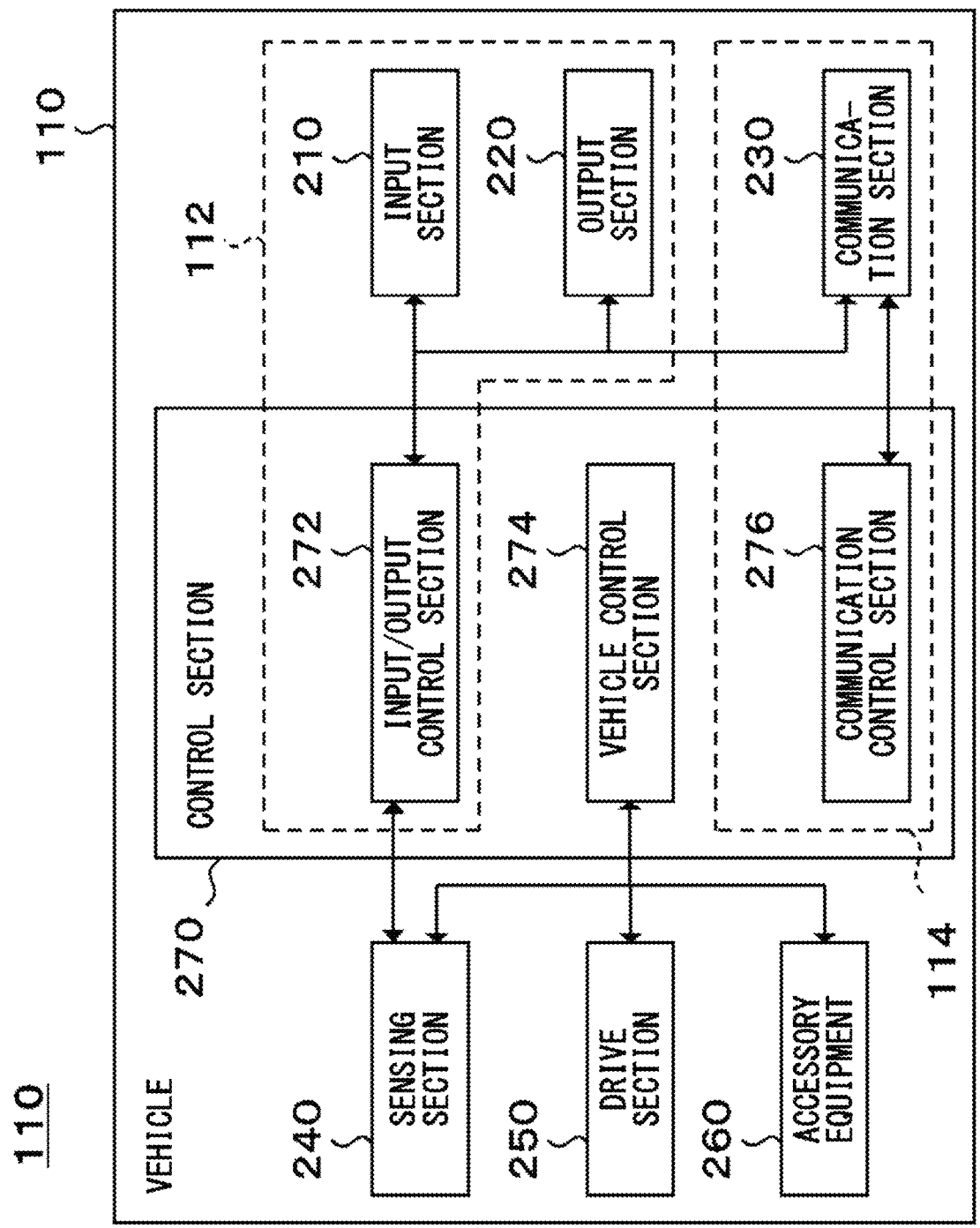
FIG. 2 schematically shows an example of an internal configuration of the vehicle 110.

FIG. 2 schematically shows an example of an internal configuration of the vehicle 110. In the present embodiment, the vehicle 110 includes an input section 210, an output section 220, a communicating section 230, a sensing section 240, a drive section 250, accessory equipment 260, and a control section 270. In the present embodiment, the control section 270 includes an input/output control section 272, a vehicle control section 274, and a communication control section 276. In the present embodiment, the response system 112 is formed by the input section 210, the output section 220, and the input/output control section 272. Furthermore, the communication system 114 is formed by the communicating section 230 and the communication control section 276.

The output section 220 may be an example of an image output section. The communicating section 230 may be an example of a request transmitting section. The control section 270 may be an example of the control apparatus and the request processing apparatus. The input-output control section 272 may be an example of the control apparatus.

In the present embodiment, the input section 210 receives the input of information. For example, the input section 210 receives the request from the user 20. The input section 210 may receive the request from the user 20 via the communication terminal 30.

In one embodiment, the input section 210 receives a request concerning manipulation of the vehicle 110. Examples of the request concerning manipulation of the vehicle 110 include a request concerning manipulation or setting of the sensing section 240, a request concerning manipulation or setting of the drive section 250, a request concerning manipulation or setting of the accessory equipment 260, and the like. Examples of the request concerning setting include a request for changing a setting, a request for checking a setting, and the like. In another embodiment, the input section 210 receives a request indicated by at least one of the voice and a gesture of the user 20.

Examples of the input section 210 include a keyboard, a pointing device, a touch panel, a manipulation button, a microphone, a camera, a sensor, a three-dimensional scanner, a gaze measuring instrument, a handle, an acceleration pedal, a brake, a shift bar, and the like. The input section 210 may form a portion of the navigation apparatus.

In the present embodiment, the output section 220 outputs information. For example, the output section 220 provides the user 20 with the response made by the interactive agent system 100 to the request from the user 20. The output section 220 may provide the user 20 with this response via the communication terminal 30. Examples of the output section 220 include an image output apparatus, a voice output apparatus, a vibration generating apparatus, an ultrasonic wave generating apparatus, and the like. The output section 220 may form a portion of the navigation apparatus.

The image output apparatus displays or projects an image of the agent. The image may be a still image or a moving image (sometimes referred to as video). The image may be a flat image or a stereoscopic image. The method for realizing a stereoscopic image is not particularly limited, and examples thereof include a binocular stereo method, an integral method, a holographic method, and the like.

Examples of the image output apparatus include a display apparatus, a projection apparatus, a printing apparatus, and the like. Examples of the voice output apparatus include a speaker, headphones, earphones, and the like. The speaker may have directivity, and may have a function to adjust or change the orientation of the directivity.

In the present embodiment, the communicating section 230 communicates information between the vehicle 110 and the support server 120, via the communication network 10. The communicating section 230 may communicate information between the vehicle 110 and the communication terminal 30 using wired communication or short-range wireless communication. The communicating section 230 may correspond to one or more communication methods.

In the present embodiment, the sensing section 240 includes one or more sensors that detect or monitor the state of the vehicle 110. Each of the one or more sensors may be any internal field sensor or any external field sensor. At least some of one or more sensing sections 240 may be used as the input section 210. For example, the sensing section 240 may include at least one of a camera that captures an image of the inside of the vehicle 110, a microphone that gathers sound inside the vehicle 110, a camera that captures an image of the outside of the vehicle 110, and a microphone that gathers sound outside the vehicle 110. These cameras and microphones may be used as the input section 210.

Examples of the state of the vehicle 110 include velocity, acceleration, tilt, vibration, noise, operating status of the drive section 250, operating status of the accessory equipment 260, operating status of a safety apparatus, operating status of an automatic driving apparatus, abnormality occurrence status, current position, movement route, outside air temperature, outside air humidity, outside air pressure, internal space temperature, internal space humidity, internal space pressure, position relative to surrounding objects, velocity relative to surrounding objects, and the like. Examples of the safety apparatus include an ABS (Antilock Brake System), an airbag, an automatic brake, an impact avoidance apparatus, and the like.

In the present embodiment, the drive section 250 drives the vehicle 110. The drive section 250 may drive the vehicle 110 according to a command from the control section 270. The drive section 250 may generate power using an internal combustion engine, or may generate power using an electrical engine.

In the present embodiment, the accessory equipment 260 may be a device other than the drive section 250, among the devices mounted in the vehicle 110. The accessory equipment 260 may operate according to a command from the control section 270. The accessory equipment 260 may operate according to a manipulation made by the user 20. Examples of the accessory equipment 260 include a security device, a seat adjustment device, a lock management device, a window opening and closing device, a lighting device, an air conditioning device, a navigation device, an audio device, a video device, and the like.

In the present embodiment, the control section 270 controls each section of the vehicle 110. The control section 270 may control the response system 112. The control section 270 may control the communication system 114. The control section 270 may control at least one of the input section 210, the output section 220, the communicating section 230, the sensing section 240, the drive section 250, and the accessory equipment 260. Furthermore, the sections of the control section 270 may transmit and receive information to and from each other.

In the present embodiment, the input/output control section 272 controls the input and output of information in the vehicle 110. For example, the input/output control section 272 controls the transmission of information between the user 20 and the vehicle 110. The input/output control section 272 may control the operation of at least one of the input section 210 and the output section 220. The input/output control section 272 may control the operation of the response system 112.

As an example, the input/output control section 272 acquires information including the request from the user 20, via the input section 210. The input/output control section 272 determines the response to this request. The input/output control section 272 may determine at least one of the content and the mode of the response. The input/output control section 272 outputs information concerning this response. In one embodiment, the input/output control section 272 provides the user 20 with information including this response, via the output section 220. In another embodiment, the input/output control section 272 transmits the information including this response to the communication terminal 30, via the communicating section 230. The communication terminal 30 provides the user 20 with the information including this response.

The input/output control section 272 may determine the response to the above request using at least one of the local interaction engine and the cloud interaction engine. In this way, the input/output control section 272 can cause the response system 112 to function as the user interface of the local interaction engine. Furthermore, the input/output control section 272 can cause the response system 112 to function as the user interface of the cloud interaction engine.

The input/output control section 272 may determine whether to respond based on the execution results of the process by the local interaction engine or of the process by the cloud interaction engine, based on the information (sometimes referred to as communication information) indicating the communication state between the vehicle 110 and the support server 120. The input/output control section 272 may use a plurality of local interaction engines or may use a plurality of cloud interaction engines. In this case, the input/output control section 272 may determine which interaction engine's process execution results the response is to be based on, based at least the communication information. The input/output control section 272 may determine which interaction engine's process execution results the response is to be based on, according to the speaker or the driver. The input/output control section 272 may determine which interaction engine's process execution results the response is to be based on, according to the presence or lack of a passenger.

The input/output control section 272 acquires the communication information from the communication control section 276, for example. The communication information may be (i) information indicating the communication state between the communicating section 230, the input/output control section 272, or the communication control section 276 and the support server 120, (ii) information indicating the communication state between the communicating section 230, the input/output control section 272, or the communication control section 276 and the communication network 10, (iii) information indicating the communication state of the communication network 10, (iv) information indicating the communication state between the communication network 10 and the support server 120, or (iv) information indicating the presence or lack of communication obstruction in at least one of the vehicle 110 and the support server 120.

The input/output control section 272 may detect the occurrence of one or more events, and control the operation of the response system 112 based on the type of the detected event. In one embodiment, the input/output control section 272 detects the input of an activation request. When input of the activation request is detected, the input/output control section 272 determines that the state of the response system 112 is to be changed from the standby state to the active state, for example.

In another embodiment, the input/output control section 272 detects the occurrence of an event for which a message is to be transmitted to the communication terminal 30 of the user 20 (sometimes referred to as a message event). When the occurrence of a message event is detected, the input/output control section 272 determines that a voice message is to be transmitted to the communication terminal 30 of the user 20, via the communication network 10, for example.

In the present embodiment, the voice message is transmitted to the communication terminal 30, using a voice communication service or an IP telephone service. In another embodiment, the voice message is transmitted to the communication terminal 30 as an electronic file of voice data, using a mail service, social network service, messenger service, or the like.

The input/output control section 272 may control the mode of the agent when responding to the request from the user 20. In one embodiment, the input/output control section 272 controls the mode of the agent based on the communication information. For example, the input/output control section 272 switches the mode of the agent between a case where the communication state between the vehicle 110 and the support server 120 satisfies a predetermined condition and a case where the communication state between the vehicle 110 and the support server 120 does not satisfy this predetermined condition. The predetermined condition may be a condition such as the communication state being better than a predetermined specified state.

In another embodiment, the input/output control section 272 controls the mode of the agent based on information indicating the interaction engine that processed the request from the user 20. For example, the input/output control section 272 switches the mode of the agent between a case where the response is made based on the execution results of the process in the local interaction engine and a case where the response is made based on the execution results of the process in the cloud interaction engine. As described above, the determination concerning which interaction engines' process execution results the response is to be based on is made based on the communication information.

In another embodiment, the input/output control section 272 controls the mode of the agent based on at least one of (i) information indicating a transmission means of the request of the user 20, (ii) information indicating how the user 20 communicated the request, and (iii) information indicating at least one of a psychological state, a wakefulness state, and a health state of the user 20 at the time the request is transmitted. Examples of the communication means of the request include an utterance, sign language, a gesture other than sign language, and the like. Examples of gestures other than sign language include a signal defined by moving a hand or finger, a signal defined by moving the head portion, a signal defined by line of sight, a signal defined by a facial expression, and the like.

Examples of how the request is communicated include the condition of the user 20 when the request is transmitted, the amount of time needed to transmit the request, the degree of clarity of the request, and the like. Examples of the condition of the user 20 when the request is transmitted include (i) the tone, habit, tempo, and pauses in the utterances or sign language, (ii) the accent, intonation, and voice volume of the utterances, (iii) the relative positions of the user and the output section 220 or the agent, and (iv) the position of the gazing point. Examples of the degree of clarity of the request include whether the request was transmitted to the end, whether a message for transmitting the request is redundant, and the like.

In yet another embodiment, the input/output control section 272 controls the mode of the agent based on information indicating the state of the vehicle 110. The state of the vehicle 110 may be at least one of the movement state of the vehicle 110, the operational state of each section of the vehicle 110, and the state of the internal space of the vehicle 110.

Examples of the movement state of the vehicle 110 include a current position, a movement route, velocity, acceleration, tilt, vibration, noise, presence or lack and degree of traffic, continuous driving time, presence or lack and frequency of sudden acceleration, presence or lack and frequency of sudden deceleration, and the like. Examples of the operational state of each section of the vehicle 110 include the operating status of the drive section 250, the operating status of the accessory equipment 260, the operating status of the safety apparatus, the operating status of the automatic driving apparatus, and the like. Examples of the operating status include normal operation, stopped, maintenance, abnormality occurring, and the like. The operational status may include the presence or lack and frequency of the operation of a specified function.

In the present embodiment, the vehicle control section 274 controls the operation of the vehicle 110. For example, the vehicle control section 274 acquires the information output by the sensing section 240. The vehicle control section 274 may control the operation of at least one of the drive section 250 and the accessory equipment 260. The vehicle control section 274 may control the operation of at least one of the drive section 250 and the accessory equipment 260, based on the information output by the sensing section 240.

In the present embodiment, the communication control section 276 controls the communication between the vehicle 110 and an external device. The communication control section 276 may control the operation of the communicating section 230. The communication control section 276 may be a communication interface. The communication control section 276 may correspond to one or more communication methods. The communication control section 276 may detect or monitor the communication state between the vehicle 110 and the support server 120. The communication control section 276 may generate the communication information, based on the result of this detection or monitoring. For example, if the communication state indicated by the communication information satisfies a predetermined condition, it can be judged that the communication state is good. On the other hand, if the communication state indicated by the communication information does not satisfy the predetermined condition, it can be judged that the communication state is bad. The predetermined condition is exemplified by a condition that communication is possible, a condition that the radio wave status satisfies a prescribed status, a condition that the communication quality is better than a prescribed quality, and the like.

Examples of the communication information include information concerning communication availability, radio wave status, communication quality, type of communication method, type of communication carrier, and the like. Examples of the radio wave status include radio wave reception level, radio wave strength, RSCP (Received Signal Code Power), CID (Cell ID), and the like. Examples of the communication quality include communication speed, data communication throughput, data communication latency, and the like.

Concerning the communication availability, communication is judged to be impossible (sometimes referred to as communication being unavailable) when communication obstruction occurs in at least one of the communication network 10, the communication system 114, and the support server 120. The communication may be judged to be unavailable when the radio wave reception level is less than a predetermined level (e.g. when out of service range). The communication availability may be judged based on results obtained by repeatedly performing a process (sometimes referred to as test) to acquire information concerning a specified radio wave status or communication quality.

According to one embodiment, the communication is judged to be possible (sometimes referred to as communication being available) when a ratio of the tests indicating that the radio wave status or communication quality is better than a predetermined first threshold, among a predetermined number of tests, is greater than a predetermined second threshold value. In any other case, communication is judged to be unavailable. According to another embodiment, the communication is judged to be unavailable when a ratio of the tests indicating that the radio wave status or communication quality is worse than a predetermined first threshold, among a predetermined number of tests, is greater than a predetermined second threshold value. In any other case, communication is judged to be available.

[Outline of Each Section of the Input/Output Control Section 272]

Figure 3:
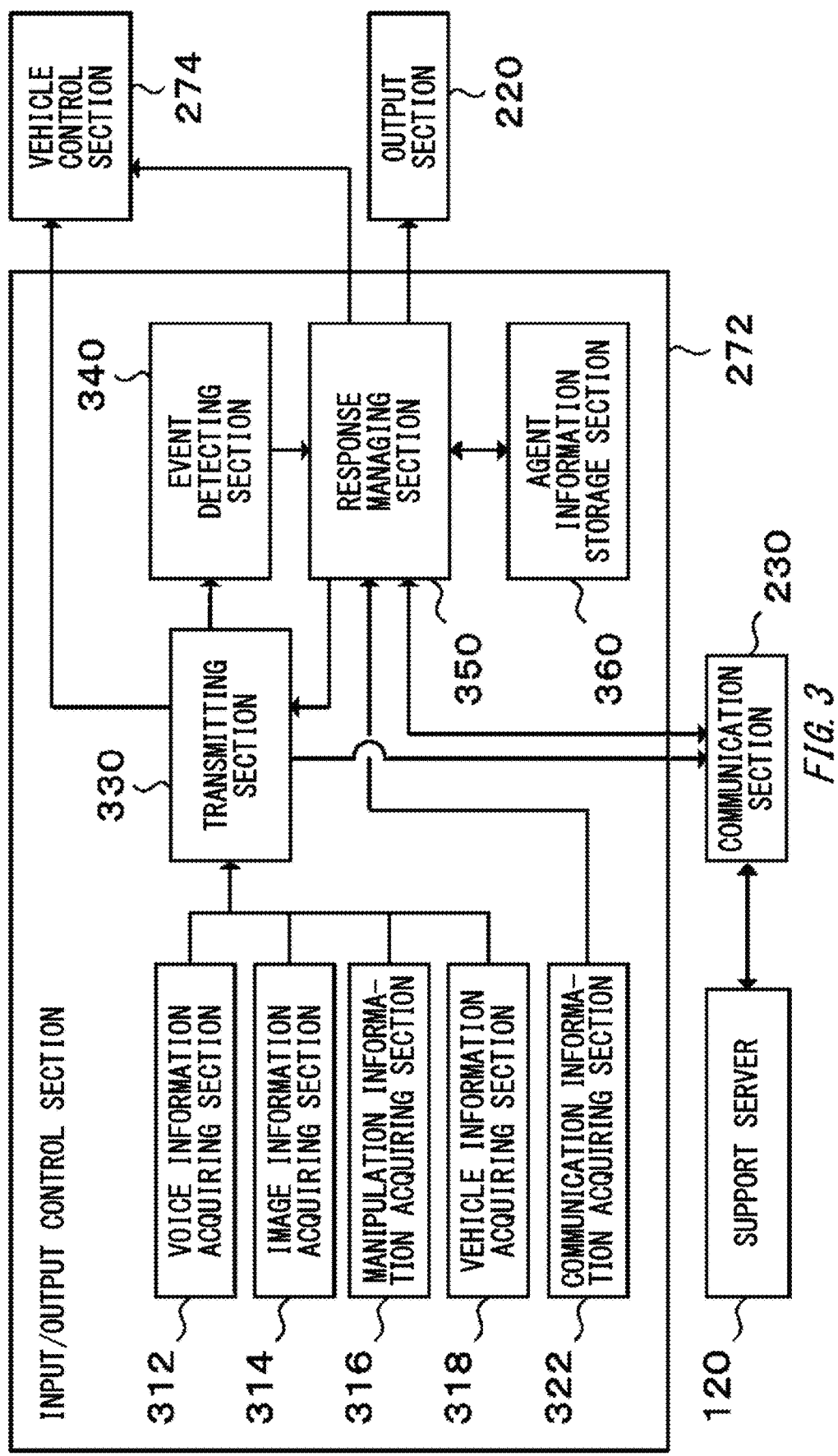
FIG. 3 schematically shows an example of an internal configuration of the input/output control section 272.

FIG. 3 schematically shows an example of an internal configuration of the input/output control section 272. In the present embodiment, the input/output control section 272 includes a voice information acquiring section 312, an image information acquiring section 314, a manipulation information acquiring section 316, a vehicle information acquiring section 318, a communication information acquiring section 322, a transmitting section 330, an event detecting section 340, a response managing section 350, and an agent information storage section 360.

The event detecting section 340 may be an example of a gaze point specifying section. The event detecting section 340 may be an example of an event detecting section. The response managing section 350 may be an example of a state determining section, a message control section, a face control section, and a relative position information acquiring section. The response managing section 350 may be an example of an expression control section, a passenger specifying section, and a psychological information acquiring section. The response managing section 350 may be an example of a transmission determining section and a content determining section. The response managing section 350 may be an example of a feature information acquiring section, a mode determining section, and a moving body information acquiring section.

In the present embodiment, the voice information acquiring section 312 acquires, from the input section 210, information (sometimes referred to as voice information) concerning a voice input to the input section 210. The voice information acquiring section 312 may acquire, via the communicating section 230, information (sometimes referred to as voice information) concerning a voice input to an input apparatus of the communication terminal 30. For example, the voice information acquiring section 312 acquires information concerning the voice of the user 20. Examples of voice information include voice data in which the voice is recorded, information indicating the timing at which this voice was recorded, and the like. The voice information acquiring section 312 may output the voice information to the transmitting section 330.

In the present embodiment, the image information acquiring section 314 acquires, from the input section 210, information (sometimes referred to as image information) concerning an image acquired by the input section 210. The image information acquiring section 314 may acquire, via the communicating section 230, information (sometimes referred to as image information) concerning an image acquired by an input apparatus of the communication terminal 30. For example, the image information acquiring section 314 acquires information concerning an image obtained by capturing an image of the user 20. Examples of the image information include image data in which an image is recorded, information indicating the timing at which the image was recorded, and the like. The image information acquiring section 314 may output the image information to the transmitting section 330.

In the present embodiment, the manipulation information acquiring section 316 acquires, from the input section 210, information (sometimes referred to as manipulation information) concerning a manipulation of the vehicle 110 by the user 20. Examples of the manipulation of the vehicle 110 include at least one of a manipulation concerning the drive section 250 and a manipulation concerning the accessory equipment 260. In one embodiment, the manipulation information acquiring section 316 outputs the manipulation to the transmitting section 330. In another embodiment, the manipulation information acquiring section 316 outputs the manipulation information to the vehicle control section 274.

Examples of the manipulation concerning the drive section 250 include handle manipulation, acceleration pedal manipulation, brake manipulation, manipulation concerning a change of the driving mode, and the like. Examples of the manipulation concerning the accessory equipment 260 include manipulation concerning turning the accessory equipment 260 ON/OFF, manipulation concerning setting of the accessory equipment 260, manipulation concerning operation of the accessory equipment 260, and the like. More specific examples include manipulation concerning a direction indicating device, manipulation concerning a wiper, manipulation concerning the ejection of window washing fluid, manipulation concerning door locking and unlocking, manipulation concerning window opening and closing, manipulation concerning turning an air conditioner or lighting device ON/OFF, manipulation concerning setting of the air conditioner or lighting device, manipulation concerning turning a navigation device, audio device, or video device ON/OFF, manipulation concerning setting of the navigation device, audio device, or video device, manipulation concerning the starting or stopping the operation of the navigation device, audio device, or video device, and the like.

In the present embodiment, the vehicle information acquiring section 318 acquires, from the sensing section 240, information (sometimes referred to as vehicle information) indicating the state of the vehicle 110. In one embodiment, the vehicle information acquiring section 318 outputs the vehicle information to the transmitting section 330. In another embodiment, the vehicle information acquiring section 318 may output the vehicle information to the vehicle control section 274.

In the present embodiment, the communication information acquiring section 322 acquires the communication information from the communication control section 276. In one embodiment, the communication information acquiring section 322 outputs the communication information to the response managing section 350. In another embodiment, the communication information acquiring section 322 may output the communication information to the transmitting section 330 or event detecting section 340.

In the present embodiment, the transmitting section 330 transmits at least one of the voice information, the image information, the manipulation information, and the vehicle information to at least one of the event detecting section 340 and the support server 120. The transmitting section 330 may determine the transmission destination of each type of information according to commands from the response managing section 350. The transmitting section 330 may transmit the manipulation information to the vehicle control section 274. The transmitting section 330 may transmit the manipulation information and the vehicle information to the vehicle control section 274.

In the present embodiment, the details of the input/output control section 272 are described using an example of a case in which the communication information acquiring section 322 outputs the communication information to the response managing section 350 and the response managing section 350 determines the transmission destination of the voice information, the image information, the manipulation information, the vehicle information, and the like based on the communication information. However, the input/output control section 272 is not limited to the present embodiment. In another embodiment, the communication information acquiring section 322 may output the communication information to the transmitting section 330, and the transmitting section 330 may determine the transmission destination of the voice information, the image information, the manipulation information, the vehicle information, and the like based on the communication information.

In the present embodiment, the event detecting section 340 detects the occurrence of one or more events. The event detecting section 340 may detect the occurrence of a predetermined type of event. When the occurrence of an event is detected, the event detecting section 340 may output information indicating the type of the detected event to the response managing section 350. The details of the event detecting section 340 are described further below.

In the present embodiment, the response managing section 350 manages the responses to the requests from the user 20. The response managing section 350 may manage the usage of the local interaction engine and the cloud interaction engine. For example, the response managing section 350 controls the operation of the transmitting section 330 to manage the usage of the local interaction engine and the cloud interaction engine. The response managing section 350 may manage at least one of the content and the mode of a response.

As an example, in a case where the request from the user 20 is a request concerning a search or investigation, the response managing section 350 manages the content of the response message output from the output section 220. The response managing section 350 may manage the mode of the agent at the time when the agent outputs the response message. The response managing section 350 may reference the information stored in the agent information storage section 360 to generate at least one of the voice and an image to be output from the output section 220. In a case where the request from the user 20 is a request concerning control of the vehicle 110, the response managing section 350 may output a command for controlling the vehicle 110 to the vehicle control section 274 in response to this request. The details of the response managing section 350 are described further below.

In the present embodiment, the agent information storage section 360 stores each type of information concerning the agent. The details of the agent information storage section 360 are described further below.

Figure 4:
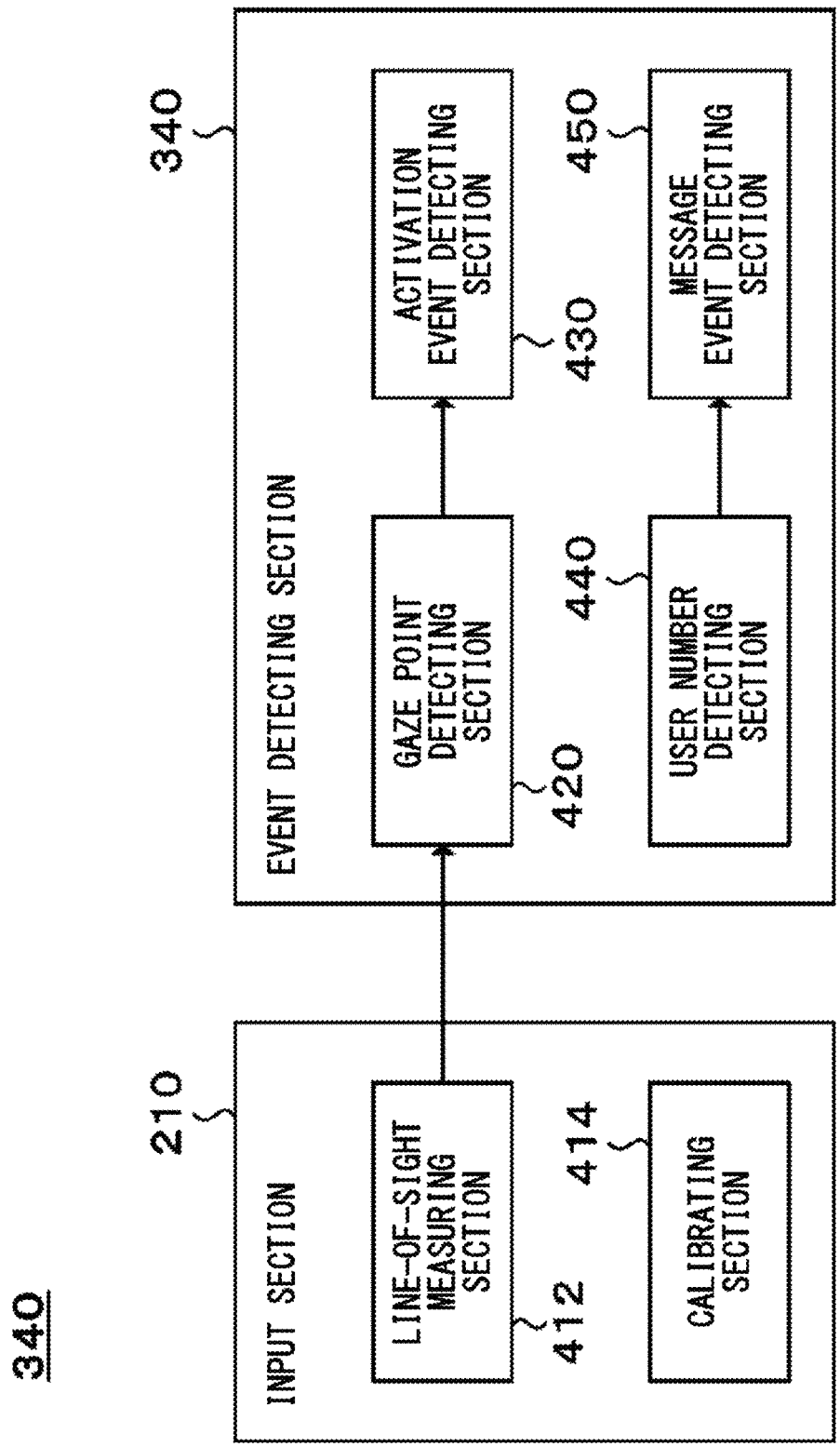
FIG. 4 schematically shows an example of an internal configuration of the event detecting section 340.

FIG. 4 schematically shows an example of an internal configuration of the event detecting section 340, along with the input section 210. In the present embodiment, the input section 210 includes a line-of-sight measuring section 412 and a calibrating section 414. In the present embodiment, the event detecting section 340 includes a gaze point detecting section 420, an activation event detecting section 430, a user number detecting section 440, and a message event detecting section 450.

The gaze point detecting section 420 may be an example of the gaze point specifying section. The user number detecting section 440 may be an example of a passenger judging section and the relative position information acquiring section. The message event detecting section 450 may be an example of a transmission event detecting section.

In the present embodiment, the line-of-sight measuring section 412 measures the line of sight of one or more users 20. The line-of-sight measuring section 412 may measure the line of sight by using a widely known eye-tracking technique or any eye-tracking technique that is developed in the future. The eye-tracking technique may be a contact type of technique such as a search coil method or eye potential method, or may be a non-contact type of technique such as a scleral reflection method or a corneal reflection method.

The line-of-sight measuring section 412 is preferably a non-contact type of line-of-sight measurement apparatus. In this case, the line-of-sight measuring section 412 includes a light radiating section (not shown in the drawings) that radiates weak light (e.g. infrared light) onto the eye of the subject and an image capturing section (not shown in the drawings) that captures an image of the eye of the subject, for example. The image capturing section may capture an image of the head portion of the subject. The line-of-sight measuring section 412 may be arranged near the output section 220, for example. In this way, when the user 20 gazes at the agent, the gaze point of the user 20 is measured accurately. The line-of-sight measuring section 412 outputs information concerning the line of sight of the subject (sometimes referred to as eye-tracking data) to the gaze point detecting section 420.

In the present embodiment, the calibrating section 414 calibrates the line-of-sight measuring section 412. More specifically, the calibrating section 414 adjusts the settings of the line-of-sight measuring section 412 in accordance with the subject. In one embodiment, the line-of-sight measuring section 412 includes a step or operational mode in which the calibrating section 414 adjusts the settings of the line-of-sight measuring section 412 in accordance with the subject, separately from a step or operational mode for tracking the line of sight of the subject. In another embodiment, the calibrating section 414 automatically calibrates the line-of-sight measuring section 412 while the line-of-sight measuring section 412 tracks the line of sight of the user 20.

In the present embodiment, the gaze point detecting section 420 acquires the eye-tracking data from the line-of-sight measuring section 412 of the input section 210. The gaze point detecting section 420 may analyze the eye-tracking data and specify the gaze point of the user 20. The gaze point detecting section 420 may output information indicating the position of the specified gaze point to at least one of the activation event detecting section 430 and the message event detecting section 450.

In the present embodiment, the activation event detecting section 430 detects various types of activation requests. The details of the activation event detecting section 430 are described further below.

In the present embodiment, the user number detecting section 440 detects the number of users 20 present in an area around the agent or the output section 220. The range of this area may be large enough to enable the response system 112 to recognize voices or gestures of the users present in the area. The user number detecting section 440 may output information indicating the number of users 20 to the response managing section 350.

The user number detecting section 440 acquires image data of the image in which the user 20 is captured from the image capturing apparatus (not shown in the drawings) of the input section 210. The user number detecting section 440 may analyze the image data and detect one or more users 20 present in the area around the agent or the output section 220. In this way, the user number detecting section 440 can detect the number of users 20 present in the area around the agent or the output section 220.

In the present embodiment, the response system 112 is mounted in a vehicle 110, which is an example of a moving body. Therefore, the user number detecting section 440 may distinguish between a passenger and a driver of the vehicle 110 among the one or more detected users 20. In this way, the user number detecting section 440 can judge whether a passenger is present in the vehicle 110. The user number detecting section 440 may output information indicating the presence or lack of a passenger in the vehicle 110 to at least one of the response managing section 350 and the message event detecting section 450.

Furthermore, the user number detecting section 440 may analyze the image data and specify the relative positions among (i) the agent or (ii) the output section 220 and each of the one or more users 20. Since the relative positions among the agent or output section 220 and the image capturing apparatus of the input section 210 are known, the gaze point detecting section 420 can specify or acquire the relative positions among (i) the agent or (ii) the output section 220 and the user 20, based on (i) the relative positions among the image capturing apparatus of the input section 210 and the user 20, acquired by analyzing the image data described above, and (ii) the relative positions among the agent or output section 220 and the image capturing apparatus of the input section 210. The user number detecting section 440 may output information indicating the relative positions among (i) the agent or (ii) the output section 220 and the user 20 (sometimes referred to as the relative position information) to the response managing section 350.

In the present embodiment, the message event detecting section 450 detects an occurrence of an event necessitating the transmission of a message to the communication terminal 30 of the user 20 (sometimes referred to as a message event). The message event detecting section 450 may detect that a message event has occurred when, in a case where a message is to be transmitted to the user 20, it is judged to be difficult to transmit the message to the user 20 using the output section 220.

For example, the message event detecting section 450 acquires manipulation information from the manipulation information acquiring section 316. The message event detecting section 450 monitors the manipulation information and judges the present or lack of information relating to a predetermined type of manipulation. When the predetermined type of manipulation is detected, the message event detecting section 450 judges that a message must be transmitted to the user 20.

Examples of this manipulation include an operation for locking or unlocking a door of the vehicle 110, an operation for starting up the vehicle 110, and the like. In this way, when an inappropriate manipulation of the vehicle 110 is made, for example, a message indicative of this can be provided as notification to the communication terminal 30 of the user 20 who is at a location physically distanced from the vehicle 110.

As an example, the message event detecting section 450 acquires vehicle information from the vehicle information acquiring section 318. The message event detecting section 450 monitors the vehicle information and judges whether the vehicle 110 is in a predetermined type of state. When it is judged that the vehicle 110 is in the predetermined type of state, the message event detecting section 450 judges that a message must be transmitted to the user 20.

Examples of the state described above include a state in which an abnormality has occurred in a function of the vehicle 110, a state in which the time for replacing a consumable product of the vehicle 110 is drawing near, a state in which a person other than the specified user 20 is manipulating the vehicle 110, a state in which the temperature inside the vehicle exceeds a predetermined value, a state in which the temperature inside the vehicle exceeds a predetermined value regardless of whether there is a person or animal inside the vehicle, and the like. In this way, when some kind of abnormality occurs in the vehicle 110, for example, a message indicative of this can be provided as notification to the communication terminal 30 of the user 20 who is at a location physically distanced from the vehicle 110.

As an example, the message event detecting section 450 acquires information indicating a detection result of the user 20 in the area around the agent or the output section 220, from the user number detecting section 440. If the user number detecting section 440 does not detect a user 20 in the area around the agent or output section 220, the message event detecting section 450 judges that it is difficult to transmit a message to the user 20 using the output section 220.

As an example, the message event detecting section 450 acquires, from the communication control section 276, information indicating whether it is possible to establish wired communication or short-range wireless communication between the communicating section 230 and the communication terminal 30. If it is not possible to establish wired communication or short-range wireless communication between the communicating section 230 and the communication terminal 30, the message event detecting section 450 judges that it is difficult to transmit a message to the user 20 using the output section 220.

In the present embodiment, the details of the event detecting section 340 are described using an example of a case in which the event detecting section 340 detects an activation event and a message event. However, the event detecting section 340 is not limited to the present embodiment. In another embodiment, the event detecting section 340 may detect another type of event in addition to or instead of the activation event or message event. For example, the event detecting section 340 detects input of a request for stopping or suspending the response process in the response system 112 (sometimes referred to as a stop request).

Figure 5:
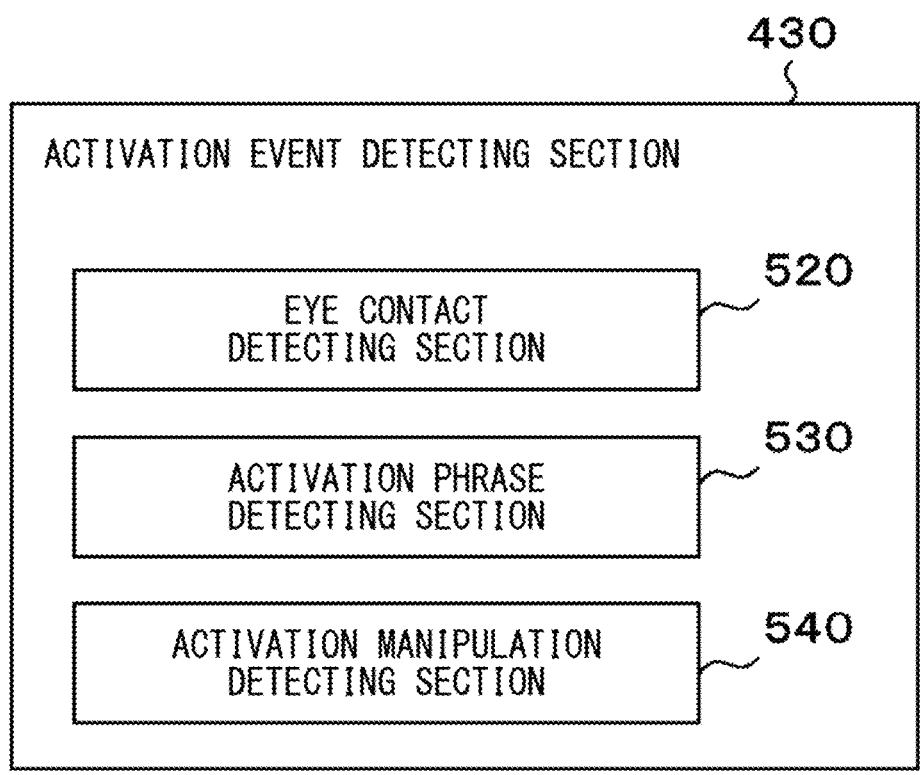
FIG. 5 schematically shows an example of an internal configuration of the activation event detecting section 430.

FIG. 5 schematically shows an example of an internal configuration of the activation event detecting section 430. In the present embodiment, the activation event detecting section 430 includes an eye contact detecting section 520, an activation phrase detecting section 530, and an activation manipulation detection section 540.

In the present embodiment, the eye contact detecting section 520 detects an activation request based on line of sight. The eye contact detecting section 520 acquires information indicating a position of the gaze point of the user 20 from the gaze point detecting section 420. The eye contact detecting section 520 may detect the activation request based on the position of the gaze point of the user 20. For example, the eye contact detecting section 520 detects the activation request if the gaze point is positioned at (i) a portion of the agent or (ii) a portion of the output section 220. The eye contact detecting section 520 may detect the activation request if the length of time that the gaze point is positioned at (i) a portion of the agent or (ii) a portion of the output section 220 is greater than a predetermined value, In this way, the user 20 can input the activation request through a gesture. Therefore, even if there is another person nearby, the user 20 can activate the response system 112 or the agent and start the interaction with the agent, without feeling hesitant.

The portion of the agent may be a portion of the face of the agent. The portion of the face of the agent may be the eyes. In this way, the user 20 can activate the response system 112 or the agent through eye contact between the user 20 and the agent.

In the present embodiment, the activation phrase detecting section 530 detects an activation request made through a voice. The activation request made through a voice may be a predetermined activation word or activation phrase. In the present embodiment, the activation manipulation detection section 540 detects an activation request made through manipulation of a manipulation button or manipulation panel. The manipulation panel may be a touch panel.

Figure 6:
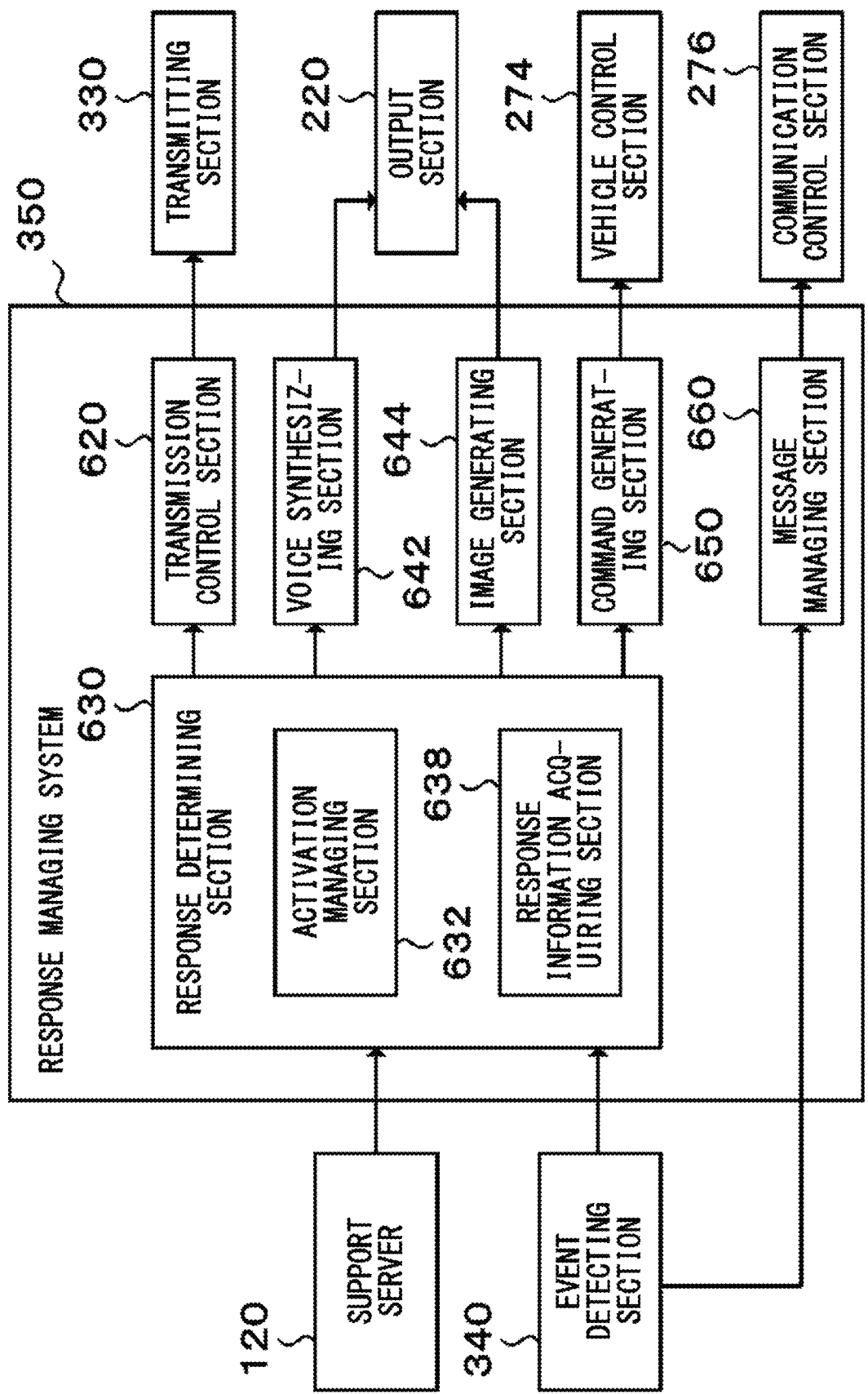
FIG. 6 schematically shows an example of an internal configuration of the response managing section 350.

FIG. 6 schematically shows an example of an internal configuration of the response managing section 350. In the present embodiment, the response managing section 350 includes a transmission control section 620, a response determining section 630, a voice synthesizing section 642, an image generating section 644, a command generating section 650, and a message managing section 660. In the present embodiment, the response determining section 630 includes an activation managing section 632 and a response information acquiring section 638.

The activation managing section 632 may be an example of a state determining section. The response information acquiring section 638 may be an example of the face control section and the relative position information acquiring section. The response information acquiring section 638 may be an example of the expression control section. The voice synthesizing section 642 may be an example of the voice message generating section. The message managing section 660 may be an example of the transmission determining section, the content determining section, and the request transmitting section.

In the present embodiment, the transmission control section 620 controls the operation of the transmitting section 330. The transmission control section 620 may generate a command for controlling the operation of the transmitting section 330 and transmit this command to the transmitting section 330. The transmission control section 620 may generate a command for changing a setting of the transmitting section 330 and transmit this command to the transmitting section 330.

As an example, when the response system 112 is activated and transitions to the standby state, the activation managing section 632 controls the transmitting section 330 such that the event detecting section 340 can detect the activation request. More specifically, the activation managing section 632 outputs, to the transmission control section 620, information indicating that the response system 112 has transitioned to the standby state.

Upon acquiring the information indicating that the response system 112 has transitioned to the standby state, the transmission control section 620 transmits, to the transmitting section 330, a command instructing the transmission of at least one of the voice information, the image information, the manipulation information, and the vehicle information to the event detecting section 340. The transmission control section 620 may transmit, to the transmitting section 330, a command instructing the transmission of (i) one of the voice information and the image information and (ii) at least one of the other of the voice information and the image information, the manipulation information, and the vehicle information to the event detecting section 340.

Furthermore, when an activation request is detected by the activation event detecting section 430, the transmission control section 620 transmits, to the transmitting section 330, a command instructing the transmission of at least one of the voice information, the image information, the manipulation information, and the vehicle information to the support server 120. The transmission control section 620 may transmit, to the transmitting section 330, a command instructing the transmission of (i) one of the voice information and the image information and (ii) at least one of the other of the voice information and the image information, the manipulation information, and the vehicle information to the event detecting section 340.

If the manipulation information is input to the transmitting section 330, the transmission control section 620 may generate the command described above such that this manipulation information is transmitted to the vehicle control section 274. In this way, the response to the manipulation of the vehicle 110 is improved.

In the present embodiment, the response determining section 630 manages the response process performed by the response system 112. For example, the response determining section 630 determines the timing at which the response process starts or ends. Furthermore, the response determining section 630 determines the response to the request from the user 20. The response determining section 630 may control the operation of the transmitting section 330 via the transmission control section 620.

In the present embodiment, the activation managing section 632 manages the timing at which the response process performed by the response system 112 starts or ends. Specifically, the activation managing section 632 acquires information indicating that an activation request has been detected, from the activation event detecting section 430. Upon acquiring the information indicating that an activation request has been detected, the activation managing section 632 makes a determination to change the state of the response system 112 from the standby state to the activation state.

In this way, in the present embodiment, in a case where the agent has a face, the activation managing section 632 can make a determination to change the state of the response system 112 from the standby state to the activation state when the gaze point of the user 20 is positioned at a portion of the face of the agent. In another embodiment, in a case where the agent has a face, the activation managing section 632 may make a determination to change the state of the response system 112 from the standby state to the activation state when the length of time that the gaze point is positioned at a portion of the face of the agent is greater than a predetermined value. The portion of the face may be the eyes.

Similarly, the activation managing section 632 acquires information indicating that a stop request has been detected, from the activation event detecting section 430. Upon receiving the information indicating that a stop request has been received, the activation managing section 632 makes a determination to change the state of the response system 112 from the activation state to the standby state.

In the present embodiment, the response information acquiring section 638 acquires information concerning the response to the request of the user 20 from the support server 120. The information concerning the response may include at least one of information indicating content of the response and information indicating a mode of the response. The information indicating the content of the response may include at least one of information indicating content of the information to be output from the output section 220 and information indicating content of a manipulation of the vehicle 110.

The response information acquiring section 638 outputs information concerning the information output via the output section 220, within the information concerning the response described above, to at least one of the voice synthesizing section 642 and the image generating section 644, for example. The response information acquiring section 638 outputs information concerning a manipulation of the vehicle 110, within the information concerning the response described above, to the command generating section 650, for example.

The voice synthesizing section 642 generates a voice message responding to the request of the user 20. The voice synthesizing section 642 acquires information concerning the response to the request of the user 20, from the response information acquiring section 638. As an example, the voice synthesizing section 642 generates the voice message based on the information indicating the content of the message. The voice synthesizing section 642 may generate the voice message based on the information indicating the content of the response and the information indicating a mode of the response. The voice synthesizing section 642 may output the generated voice message to the output section 220.

The image generating section 644 generates an image (sometimes referred to as a response image) responding to the request of the user 20. The image generating section 644 may generate an animated image of the agent responding to the request of the user 20. The image generating section 644 acquires the information concerning the response to the request of the user 20, from the response information acquiring section 638. As an example, the image generating section 644 generates the response image based on the information indicating the content of the response. The image generating section 644 may generate the response image based on the information indicating the content of the response and the information indicating the mode of the response. The image generating section 644 may output the generated response image to the output section 220.

In the present embodiment, the details of the response managing section 350 are described using an example of a case in which the agent is a software agent and the image generating section 644 generates an animated image of the agent. However, the response managing section 350 is not limited to the present embodiment. In another embodiment, in a case where the agent is a hardware agent, the response managing section 350 may include a drive control section that controls driving of each section of the agent, and the drive control section may drive the agent based on information indicating at least one of the content of the response and the mode of the response acquired by the response information acquiring section 638.

The command generating section 650 generates a command for manipulating the vehicle 110. The command generating section 650 acquires the information concerning the response to the request of the user 20, from the response information acquiring section 638. As an example, the command generating section 650 determines the type of the manipulation of the vehicle 110, based on the information indicating the content of the response. The command generating section 650 may determine a manipulation amount or a manipulation mode, based on the information indicating the mode of the response. The command generating section 650 may output the generated command to the vehicle control section 274.

In the present embodiment, the message managing section 660 manages the message to be transmitted from the vehicle 110 or the response system 112 to the communication terminal 30 of the user 20. For example, the message managing section 660 acquires information indicating that a message event has been detected, from the message event detecting section 450. When the occurrence of a message event has been detected, the message managing section 660 makes a determination to transmit a voice message to the communication terminal 30 of the user 20, via the communication network 10.

The message managing section 660 may determine the content of the message described above. The message managing section 660 may determine at least a portion of the content of the message, based on the type of the detected message event.

As an example, the message managing section 660 includes a database in which information indicating the type of the message event and information indicating the content of the message to be transmitted when this event is detected are associated with each other. The message managing section 660 may reference the information stored in this database and determine the content of the message described above. The message managing section 660 may determine the content of the message described above by using one or more fixed messages having predetermined content.

In one embodiment, the fixed message is configured such that it is possible to dynamically edit a portion of the content thereof. The message managing section 660 edits a portion of the fixed message to determine the content of the message described above. In another embodiment, the message managing section 660 combines a plurality of fixed messages to determine the content of the message described above. Several fixed messages may be configured such that it is possible to dynamically edit portions of the contents thereof.

When the content of the message is determined, the message managing section 660 generates the voice message using the voice information of a voice of a character associated with the vehicle 110 or the response system 112. For example, the message managing section 660 transmits the information indicating the content of the message to the voice synthesizing section 642, and requests that this message be converted into a voice message.

The information indicating the content of the message may be text information indicating the content of the message, or may be identification information for identifying each of one or more fixed messages having predetermined content. As an example, the voice synthesizing section 642 combines the voice information of the voice of the character described above and the information indicating the content of the message, to generate the voice message. The voice information of the voice of the character is stored in the agent information storage section 360, for example.

The message managing section 660 may determine a transmission method for the generated voice message. Examples of the voice message transmission method include (i) a method of performing transmission using wired communication or short-range wireless communication between the communicating section 230 of the vehicle 110 and the communication terminal 30, (ii) a method of performing transmission via the support server 120, and the like.

In a case where the voice message is transmitted via the support server 120, in the present embodiment, the message managing section 660 transmits to the support server 120 a relay request requesting transmission of the voice message. The message managing section 660 may transmit the voice data of the message along with this relay request to the support server 120. In another embodiment, the message managing section 660 transmits to the support server 120 a relay request requesting generation and transmission of the voice message. The message managing section 660 may transmit the information indicating the content of the message and the information for specifying the character, along with this relay request, to the support server 120.

The message managing section 660 may make a determination to transmit the voice message to the communication terminal 30 using a voice communication service or an IP telephone service. The message managing section 660 may make a determination to transmit the voice message to the communication terminal 30 as an electronic file of voice data, using a mail service, social network service, messenger service, or the like.

Figure 7:
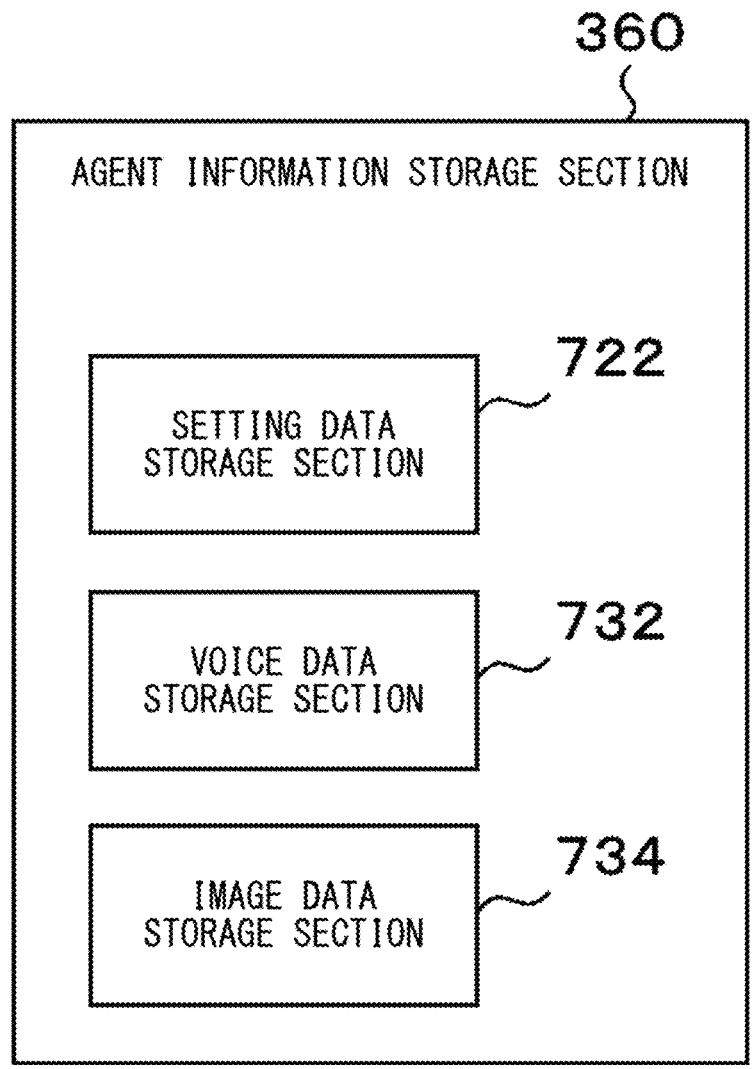
FIG. 7 schematically shows an example of an internal configuration of the agent information storage section 360.

FIG. 7 schematically shows an example of the internal configuration of the agent information storage section 360. In the present embodiment, the agent information storage section 360 includes a setting data storage section 722, a voice data storage section 732, and an image data storage section 734. The voice data storage section 732 may be an example of a voice information storage section.

In the present embodiment, the setting data storage section 722 stores the information concerning the settings of each agent. Examples of the setting include age, gender, personality, and impression to be conveyed to the user 20. In the present embodiment, the voice data storage section 732 stores information (sometimes referred to as voice information) for synthesizing the voice of each agent. For example, the voice data storage section 732 stores data enabling a computer to read out a message with the voice of the character, for each character. In the present embodiment, the image data storage section 734 stores information for generating an image of each agent. For example, the image data storage section 734 stores data enabling a computer to dynamically generate an animated image of each character.

[Outline of Each Section of the Support Server 120]

Figure 8:
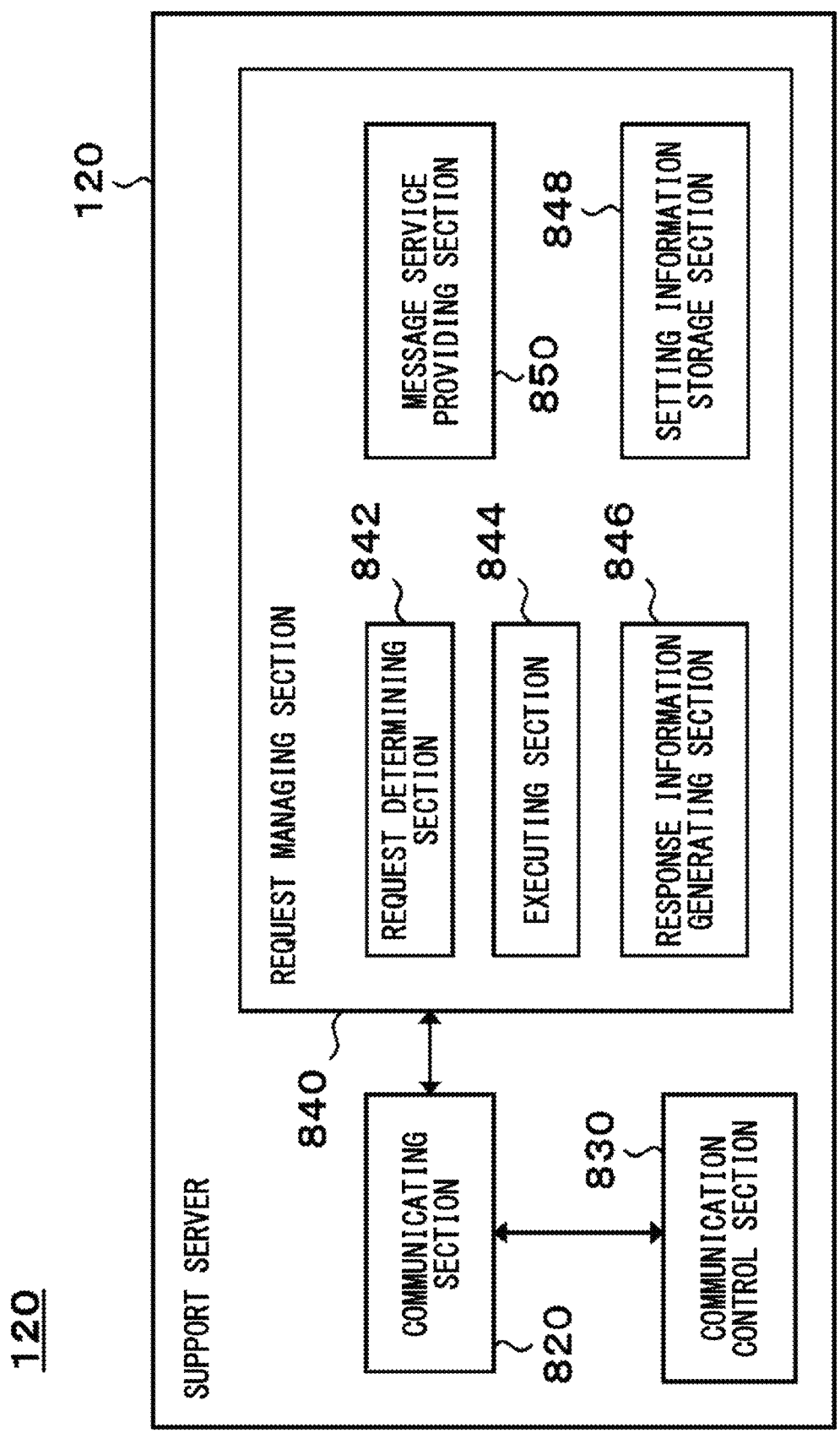
FIG. 8 schematically shows an example of an internal configuration of the support server 120.

FIG. 8 schematically shows an example of the internal configuration of the support server 120. In the present embodiment, the support server 120 includes a communicating section 820, a communication control section 830, and a request processing section 840. In the present embodiment, the request processing section 840 includes a request determining section 842, an executing section 844, a response information generating section 846, a setting information storage section 848, and a message service providing section 850.

The response information generating section 846 may be an example of a message control section. The setting information storage section 848 may be an example of a user information storage section and a history storage section. The message service providing section 850 may be an example of a relay apparatus.

According to the support server 120 of the present embodiment, the cloud interaction engine is realized by cooperation between hardware and software. Furthermore, in the present embodiment, the support server 120 provides a message service for relaying messages from the agent to the user 20.

In the present embodiment, the communicating section 820 transmits and receives information between the support server 120 and at least one of the vehicle 110 and the communication terminal 30, via the communication network 10. The communicating section 820 may have the same configuration as the communicating section 230.

In the present embodiment, the communication control section 830 controls the communication between the support server 120 and an external device. The communication control section 830 may control the operation of the communicating section 820. The communication control section 830 may have a configuration similar to that of the communication control section 276.

In the present embodiment, the request processing section 840 acquires a request from the user 20 and performs a process corresponding to this request. The request processing section 840 determines a response to this request. For example, the request processing section 840 determines at least one of the content and the mode of the response. The request processing section 840 generates the information concerning the response, based on this determination result. The request processing section 840 may output the information concerning the response to the response managing section 350 of the vehicle 110.

In the present embodiment, the request processing section 840 provides a message service for relating messages from the agent of the vehicle 110 to the user 20. These messages are read in the voice of the character used as the agent of the vehicle 110. In this way, when the user 20 receives a message, the user 20 can intuitively judge which device the message is from. For example, in a case where a single user 20 has a plurality of devices and a different character is set as an agent for each device, the above feature realizes an even greater effect.

In the present embodiment, the request determining section 842 acquires at least a portion of the information input from the vehicle 110 to the transmitting section 330 of the vehicle 110, via the communication network 10. The request determining section 842 analyzes the information acquired from the vehicle 110 and recognizes a request of the user 20. If a message request is recognized among the recognized requests, the request determining section 842 may output this message request to the message service providing section 850. If another request is recognized, the request determining section 842 may output this request to the executing section 844. The details of the request determining section 842 are described further below.

In the present embodiment, the executing section 844 acquires information indicating the type of the recognized request, from the request determining section 842. The executing section 844 may perform a process corresponding to the type of the recognized request. The executing section 844 may reference the information stored in the setting information storage section 848 to determine this process. As an example, the executing section 844 outputs information indicating the performance result to the response information generating section 846. The executing section 844 may output information indicating that the process has been performed to the response information generating section 846.

In the present embodiment, the response information generating section 846 determines the response to the request from the user 20. The response information generating section 846 may determine at least one of the content and the mode of the response. The response information generating section 846 may generate information concerning at least one of the determined content and mode of the response (sometimes referred to as response information). The response information generating section 846 may output the generated response information to the response managing section 350 of the vehicle 110.

Examples of the content of the response include the type or content of the response message output from the output section 220, the type or content of the command transmitted to the vehicle control section 274, and the like. In a case where one or more fixed messages are prepared as response messages, the type of the response message may be identification information for identifying each of the one or more fixed messages. The type of the command may be identification information for identifying each of one or more commands capable of being performed by the vehicle control section 274.

Examples of the mode of the response include the mode of the agent when the output section 220 outputs the response message, the mode of the control of the vehicle 110 performed by the vehicle control section 274, and the like.

As described above, examples of the mode of the agent include at least one of the type of character used as the agent, the appearance of this character, the voice of this character, and the mode of the interaction. Examples of the mode of the control of the vehicle 110 include modes for restricting sudden manipulations such as sudden acceleration, sudden deceleration, sudden steering, and the like.

In the present embodiment, the setting information storage section 848 stores various types of information used in the processing of each section in the request processing section 840. In the present embodiment, the setting information storage section 848 stores identification information for identifying the type of the request of the user 20 and feature information indicating a feature for recognizing these requests, in association with each other. The setting information storage section 848 may store information indicating at least one of the type and content of the request of the user 20 and information indicating at least one of the content and the mode of the process corresponding to this request, in association with each other. The setting information storage section 848 may store the identification information for identifying the type of the request of the user 20, the feature information indicating a feature for recognizing this request, and the information indicating at least one of the content and the mode of the process corresponding to this request, in association with each other.

In another embodiment, the setting information storage section 848 stores (i) user identification information for identifying each user and (ii) voice information of the voice of the character of the agent to be used to communicate information to each user or information for specifying this voice information, in association with each other. The setting information storage section 848 may store (i) the user information for identifying each user, (ii) device identification information for identifying each agent or each device mounted in the response system 112, and (iii) the voice information of the voice of the character of each agent or of the voice of the agent to be used by each device to communicate information to each user, or information for specifying this voice information, in association with each other.

In yet another embodiment, the setting information storage section 848 stores (i) the information indicating the content of the message and (ii) information indicating the psychological state of each user at the time when this message was transmitted, in association with each other. The setting information storage section 848 may store (i) the user identification information for identifying each user, (ii) the information indicating the content of the message, and (iii) the information indicating the psychological state of each user at the time when this message was transmitted, in association with each other.

In the present embodiment, the message service providing section 850 provides a message service for relaying messages from the agent of the vehicle 110 to the user 20. The details of the message service providing section 850 are described further below.

Figure 9:
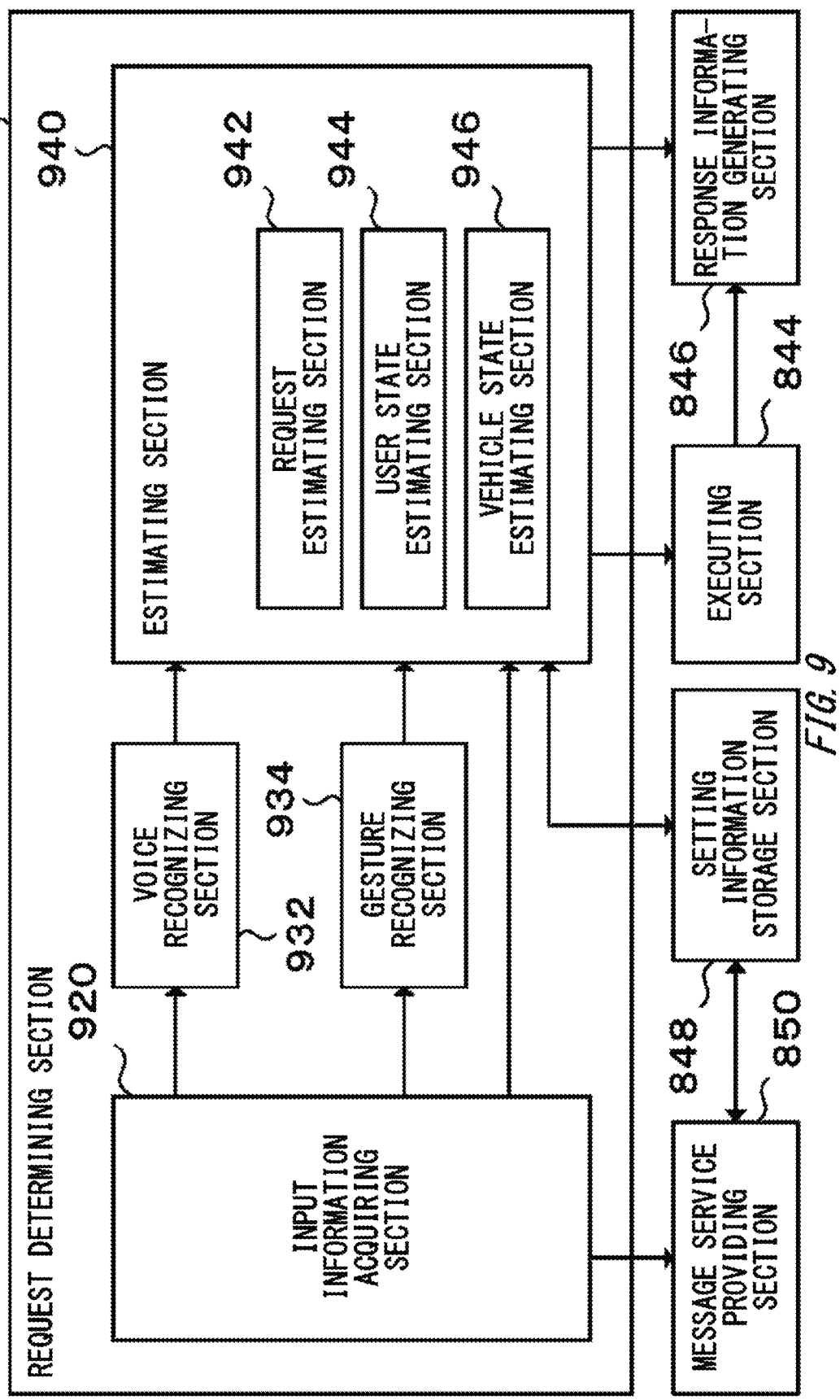
FIG. 9 schematically shows an example of an internal configuration of the request determining section 842.

FIG. 9 schematically shows an example of the internal configuration of the request determining section 842. In the present embodiment, the request determining section 842 includes an input information acquiring section 920, a voice recognizing section 932, a gesture recognizing section 934, and an estimating section 940. In the present embodiment, the estimating section 940 includes a request estimating section 942, a user state estimating section 944, and a vehicle state estimating section 946.

The user state estimating section 944 may be an example of a psychological information acquiring section and a feature information acquiring section. The vehicle state estimating section 946 may be an example of a moving body information acquiring section.

In the present embodiment, the input information acquiring section 920 acquires the information to be input to the request processing section 840. For example, the input information acquiring section 920 acquires at least one of the voice information acquired by the voice information acquiring section 312 and the image information acquired by the image information acquiring section 314. The input information acquiring section 920 may acquire at least one of the voice information acquired by the voice information acquiring section 312, the image information acquired by the image information acquiring section 314, the manipulation information acquired by the manipulation information acquiring section 316, and the vehicle information acquired by the vehicle information acquiring section 318. The input information acquiring section 920 may acquire (i) one of the voice information and the image information and (ii) at least one of the other of the voice information and the image information, the manipulation information, and the vehicle information.

In the present embodiment, the input information acquiring section 920 transmits the acquired voice information to the voice recognizing section 932. The input information acquiring section 920 transmits the acquired image information to the gesture recognizing section 934. The input information acquiring section 920 transmits the acquired manipulation information to the estimating section 940. The input information acquiring section 920 transmits the acquired vehicle information to the estimating section 940. The input information acquiring section 920 may transmit at least one of the acquired manipulation information and vehicle information to at least one of the voice recognizing section 932 and the gesture recognizing section 934.

In the present embodiment, the voice recognizing section 932 analyzes the voice information and specifies the content of the utterance of the user 20. The voice recognizing section 932 outputs the information indicating the content of the utterance of the user 20 to the estimating section 940. The voice recognizing section 932 may execute a process to analyze the content of the utterance and recognize the request, but does not need to execute this process.

In the present embodiment, the gesture recognizing section 934 analyzes the image information and extracts one or more gestures shown by the user 20. The gesture recognizing section 934 outputs the information indicating the extracted gesture to the estimating section 940. The gesture recognizing section 934 may execute a process to analyze the extracted gesture and recognize the request, but does not need to execute this process.

In the present embodiment, the estimating section 940 recognizes or estimates the request from the user 20. The estimating section 940 may recognize or estimate the state of the user 20. The estimating section 940 may recognize or estimate the state of the vehicle 110.

In the present embodiment, the request estimating section 942 recognizes or estimates the request from the user 20. In one embodiment, the request estimating section 942 acquires the information indicating the utterance of the user 20 from the voice recognizing section 932. The request estimating section 942 analyzes the content of the utterance of the user 20 and recognizes or estimates the request of the user 20. In another embodiment, the request estimating section 942 acquires the information indicating the gesture extracted by the analysis of the image information, from the gesture recognizing section 934. The request estimating section 942 analyzes the extracted gesture and recognizes or estimates the request of the user 20.

The request estimating section 942 may recognize or estimate the request from the user 20 by using information other than the voice image and the image information, in addition to the voice information or the image information. For example, the request estimating section 942 acquires at least one of the manipulation information and the vehicle information from the input information acquiring section 920. The request estimating section 942 may acquire the information indicating the state of the user 20 from the user state estimating section 944. The request estimating section 942 may acquire the information indicating the state of the vehicle 110 from the vehicle state estimating section 946. By using these pieces of information, the accuracy of the recognition or estimation by the request estimating section 942 can be improved.

The request estimating section 942 may output the information indicating the type of the recognized request to the executing section 844. In a case where the request cannot be recognized despite the analysis of the voice information or image information, the request estimating section 942 may output information indicating that the request is unrecognizable to the response information generating section 846.

In the present embodiment, the user state estimating section 944 recognizes or estimates the state of the user 20. The user state estimating section 944 recognizes or estimates the state of the user 20 based on at least one of the voice information, the image information, the manipulation information, and the vehicle information. In this way, the user state estimating section 944 can acquire information indicating the state of the user 20. Examples of the state of the user 20 include at least one of the psychological state, the wakefulness state, and the health state of the user 20.

The user state estimating section 944 may output the information indicating the state of the user 20 to the request estimating section 942. In this way, the request estimating section 942 can narrow down the request candidates, for example, and therefore the estimation accuracy of the request estimating section 942 can be improved.

The user state estimating section 944 may output the information indicating the state of the user 20 to the response information generating section 846. For example, the user state estimating section 944 analyzes the voice information, image information, and the like and extracts information indicating a feature of the state of the user 20 (sometimes referred to as feature information) at the time when the user 20 transmits the request. The feature information may be information indicating a feature of at least one of voice volume, tone, tempo, length of each utterance, pauses, inflections, emphasis, how back-and-forth happens, habits, and how topics are developed. The user state estimating section 944 may output the feature information to the response information generating section 846.

In the present embodiment, the vehicle state estimating section 946 recognizes or estimates the state of the vehicle 110. The vehicle state estimating section 946 recognizes or estimates the state of the vehicle 110 based on at least one of the voice information, the image information, the manipulation information, and the vehicle information. As described above, examples of the state of the vehicle 110 include at least one of the movement state of the vehicle 110, the operational state of each section of the vehicle 110, and the state of the internal space of the vehicle 110. The vehicle state estimating section 946 may perform a process similar to that of the user number detecting section 440.

The vehicle state estimating section 946 may output the information indicating the state of the vehicle 110 to the request estimating section 942. In this way, the request estimating section 942 can narrow down the request candidates, for example, and therefore the estimation accuracy of the request estimating section 942 can be improved.

The vehicle state estimating section 946 may output the information indicating the state of the vehicle 110 to the user state estimating section 944. In this way, the user state estimating section 944 can estimate the state of the user 20 while considering the state of the vehicle 110, and therefore the estimation accuracy can be improved. For example, when there is a high frequency of sudden acceleration, sudden deceleration, sudden steering, or the like, the psychological state is estimated to be inattentive, angry, irritated, or the like. Furthermore, when the vehicle 110 is meandering, decreased alertness, health problems, or the like are estimated.

Figure 10:
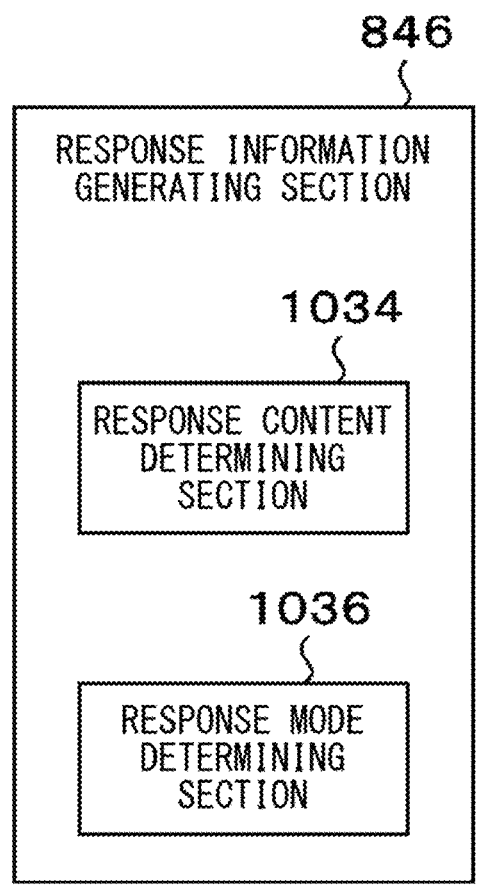
FIG. 10 schematically shows an example of an internal configuration of the response information generating section 846.

FIG. 10 schematically shows an example of an internal configuration of the response information generating section 846. In the present embodiment, the response information generating section 846 includes a response content determining section 1034 and a response mode determining section 1036.

The response content determining section 1034 may be an example of the message control section. The response mode determining section 1036 may be an example of the face control section, the relative position information acquiring section, the expression control section, the feature information acquiring section, the psychological information acquiring section, the moving body information acquiring section, and the mode determining section.

In the present embodiment, the response content determining section 1034 determines the content of the response to the request from the user 20. Examples of the content of the response include the type of process to be performed in response to the request, the content of the interaction, and the like. Examples of the content of the interaction include detailed content of a conversation, detailed content of the operation of the agent, and the like. The response content determining section 1034 may output the information indicating the content of the response to the response managing section 350.

As an example, the response content determining section 1034 makes a determination to transmit a message to the user 20. The response content determining section 1034 may make a determination to transmit a message to one or more users 20 located near the output section 220.

The type of the message is not limited. Examples of the message include a message indicating that the activation request indicated by a gesture of the user 20 has been received, a message indicating the current state of the user 20, a message prompting the user 20 to pay attention, and the like.

The response content determining section 1034 may determine whether to (i) transmit the message to the user 20 via the output section 220 or (ii) transmit the message to the user 20 via the communication terminal 30 of the user 20. The response content determining section 1034 may determine whether to (i) transmit the message to the communication terminal 30 using wired communication or short-range wireless communication established between the communicating section 230 and the communication terminal 30 or (ii) transmit the message to the communication terminal 30 via the communication network 10 and the support server 120.

The response content determining section 1034 may make a determination to transmit the message to the user 20 if a prescribed condition is satisfied. In this case, the setting information storage section 848 may store information indicating the type or the content of this condition and information indicating the type or the content of the message, in association with each other.

As an example, the response content determining section 1034 acquires the information indicating the position of the gaze point of the user 20, from the event detecting section 340 of the response system 112. If the position of the gaze point or a fluctuation of this position satisfies the prescribed condition, the response content determining section 1034 makes a determination to transmit a message corresponding to this condition to the user 20.

In one embodiment, if the position of the gaze point is located at a portion of the face of the agent, the response content determining section 1034 makes a determination to transmit a message for prompting an utterance by the user 20. Examples of a message for prompting an utterance by the user 20 include "is there something I can do for you?", "is something bothering you?", "what happened?", and the like. The message for prompting an utterance by the user 20 may be a greeting, or may be a message indicating that the activation request has been received.

As described above, if the position of the gaze point is located at a portion of the face of the agent, the activation event detecting section 430 detects the activation request. Therefore, by having the agent output the message for prompting an utterance by the user 20, the user 20 can understand that the activation request has been received.

In another embodiment, if the position of the gaze point satisfies a predetermined condition (sometimes referred to as an attention calling condition), the response content determining section 1034 makes a determination to transmit a message for prompting focusing on driving to the user. Examples of this condition include a condition that the gaze point is located within a specified range, a condition that the gaze point is stopped within a specified range throughout a predetermined interval, and the like. This specified range may be at or near a portion of the input section 210 or the output section 220. This specified range may be at or near a display arranged within the vehicle 110.

As an example, if the user 20 is the driver of the vehicle 110, examples of the attention calling condition include (i) a condition that the gaze point is not located forward in the progression direction of the vehicle 110 while the vehicle 110 is moving, (ii) a condition that the length of time during which the gaze point is not located forward in the progression direction of the vehicle 110 while the vehicle 110 is moving is greater than a predetermined threshold value, (iii) a condition that the gaze point is located near the display apparatus of the output section 220 while the vehicle 110 is moving, (iv) a condition that the length of time during which the gaze point is located near the display apparatus of the output section 220 while the vehicle 110 is moving is greater than a predetermined threshold value, and the like.

In this case, the response content determining section 1034 may acquire information indicating the presence or lack of a passenger, from the user number detecting section 440. If it is judged that a passenger is present, when the position of the gaze point satisfies the attention calling condition, the response content determining section 1034 may make a determination to transmit a message indicating that there is a possibility that the concentration of the driver is decreasing.

The response content determining section 1034 may access the setting information storage section 848 and acquire the information indicating the psychological stage of the user 20 at a time when the same type of message was transmitted in the past. The response content determining section 1034 may reference the information indicating the psychological state of the user 20 described above, and determine whether to transmit a message to the user 20 who is the driver or to transmit a message to another user 20 who is a passenger.

In the present embodiment, the response mode determining section 1036 determines the mode of the response to the request from the user 20. As described above, examples of the mode of the response include the mode of the agent at the time when the output section 220 outputs the response message, the mode of the control of the vehicle 110 performed by the vehicle control section 274, and the like. The response mode determining section 1036 may determine the mode of the response in accordance with the operation or the state of the user 20. The response mode determining section 1036 may output the information indicating the mode of the response to the response managing section 350.

[Agent Interaction Based on the Gaze Point of the User 20]

In the present embodiment, the response mode determining section 1036 makes a determination to control the orientation of the face or line of sight of the agent if a specified condition is satisfied. Similarly, the response mode determining section 1036 may make a determination to control the expression of the agent if a specified condition is satisfied.

For example, if the position of the gaze point of the user 20 or a fluctuation of this position satisfies a specified condition (sometimes referred to as a direction change condition), the response mode determining section 1036 makes a determination to control the orientation of the face or the line of sight of the agent such that the face or the line of sight of the agent is oriented in the direction of the user 20. The response mode determining section 1036 may make a determination to control the face or the line of sight of the agent such that the face or the line of sight of the agent is oriented in the direction of the user, if the gaze point of the user 20 is located at (i) a portion of the agent (e.g. the eyes) or (ii) a portion of the output section 220 that displays or projects an image of the agent.

In this way, it appears to the user 20 that the agent feels the line of sight of the user 20 and turns toward the user 20. Furthermore, it is possible to realize eye contact between the agent and the user 20. Yet further, even if the user 20 has input an activation request by making a gesture, for example, the user 20 can intuitively understand that this activation request has been received.

Similarly, the response mode determining section 1036 makes a determination to change the expression of the agent if the position of the gaze point of the user 20 or a fluctuation of this position satisfies a specified condition (sometimes referred to as an expression change condition). The response mode determining section 1036 may make a determination to change the expression of the agent if the gaze point of the user 20 is located at (i) a portion of the agent (e.g. the eyes) or (ii) a portion of the output section 220 that displays or projects an image of the agent.

In this way, even if the user 20 has input an activation request by making a gesture, for example, the user 20 can intuitively understand that this activation request has been received. When the activation request is received, the response system 112 may show that the activation request has been received, using at least one of a sound and a light.

The response mode determining section 1036 acquires information indicating relative positions among the user 20 and (i) the agent or (ii) the output section 220 (sometimes referred to as relative position information) from the user number detecting section 440, for example. The response mode determining section 1036 may determine the orientation of the face or the line of sight of the agent, based on the relative position information. In this way, the response mode determining section 1036 can control the operation of the agent such that the face or the line of sight of the agent is oriented in the direction of the user 20.

If a plurality of users 20 are present in the area around the agent or the output section 220, the response mode determining section 1036 may make a determination to control the operation of the agent such that the face or the line of sight of the agent is oriented in the directions of the users 20 according to a predetermined priority ranking. The response mode determining section 1036 may acquire information concerning one or more users 20 present in the area around the agent or the output section 220 from the user number detecting section 440, for example.

As an example, the response mode determining section 1036 may determine the priority ranking described above based on at least one of the voice volume of each user, the orientation of the face of each user, the orientation of the line of sight of each user, the state of the vehicle 110, and the seating arrangement of each user. The response mode determining section 1036 may make a determination to give priority to a user with a loud voice. The response mode determining section 1036 may make a determination to give priority to a user whose face is oriented close to the direction of the agent.

For example, if the vehicle 110 is moving, the response mode determining section 1036 determines the priority ranking in the order of the user 20 seated in the passenger seat, the user 20 seated in the driver seat, and the user 20 seated in a back seat. On the other hand, if the vehicle 110 is stopped, the response mode determining section 1036 may make a determination to prioritize the user 20 seated in the driver seat.

[Agent Interaction Based on the State of the User 20 During a Conversation]

In the present embodiment, the response mode determining section 1036 determines the mode of the agent during the response, based on the state of the user 20 at the time when the user 20 transmitted the request. As an example, the response mode determining section 1036 acquires the feature information from the user state estimating section 944. The response mode determining section 1036 may determine the mode of the agent based on a feature of the user 20 according to the feature information.

In one embodiment, the response mode determining section 1036 controls the agent such that the agent responds with the same or similar modes throughout a plurality of conversations or throughout a certain interval. In another embodiment, the response mode determining section 1036 controls the agent such that the agent responds to each request with a mode corresponding to the request.

As described above, the mode of the agent may be the mode of the interaction of the agent during the response. The mode of the interaction of the agent may be at least one of voice volume, tone, tempo, length of each utterance, pauses, inflections, emphasis, how back-and-forth happens, habits, and how topics are developed. By having the agent respond with a mode in accordance with the state of the user 20, a natural and friendly conversation is realized.

The response mode determining section 1036 may determine the mode of the agent such that the mode of the interaction of the agent is the same as or similar to the state of the user 20 indicated by the feature information. For example, if the tone of the user 20 is slow, the agent is controlled such that the agent responds with a slowed tone. If the instruction made by the user 20 is a word, or if the number of characters in the instruction made by the user 20 is less than a predetermined value, the agent is controlled such that the agent responds briefly.

For example, when the user 20 requests playback of a song ABC by politely making a request of "please play ABC", the agent also responds politely with "Understood. Now playing ABC". At this time, depending on the psychological state of the user, there are cases where the agent recommends a song corresponding to the psychological state of the user 20 with "Understood. Now playing ABC. Also, it seems that the song XYZ is popular recently." On the other hand, when the user 20 makes a brief request of "play ABC", the agent also responds briefly with "now playing ABC".

The response mode determining section 1036 may acquire the information indicating the psychological state of the user 20, from the user state estimating section 944. The response mode determining section 1036 may determine the mode of the agent based on the psychological state of the user 20. For example, if the emotion of the user 20 is such that a degree of calmness is less than a predetermined value, i.e. if the user 20 is angry, irritated, agitated, or the like, the agent is controlled such that the agent responds calmly. If the emotion of the user 20 is excited or happy, the agent is controlled such that the agent responds cheerfully.

If the user 20 is the driver of the vehicle 110, the response mode determining section 1036 may acquire the information indicating the operational state of the vehicle 110 from the vehicle state estimating section 946. The response mode determining section 1036 may determine the mode of the agent based on the operational state of the vehicle 110. For example, the response mode determining section 1036 determines the mode of the agent according to the speed of the vehicle 110. The response mode determining section 1036 may determine the mode of the agent according to the amount of traffic.

Figure 11:
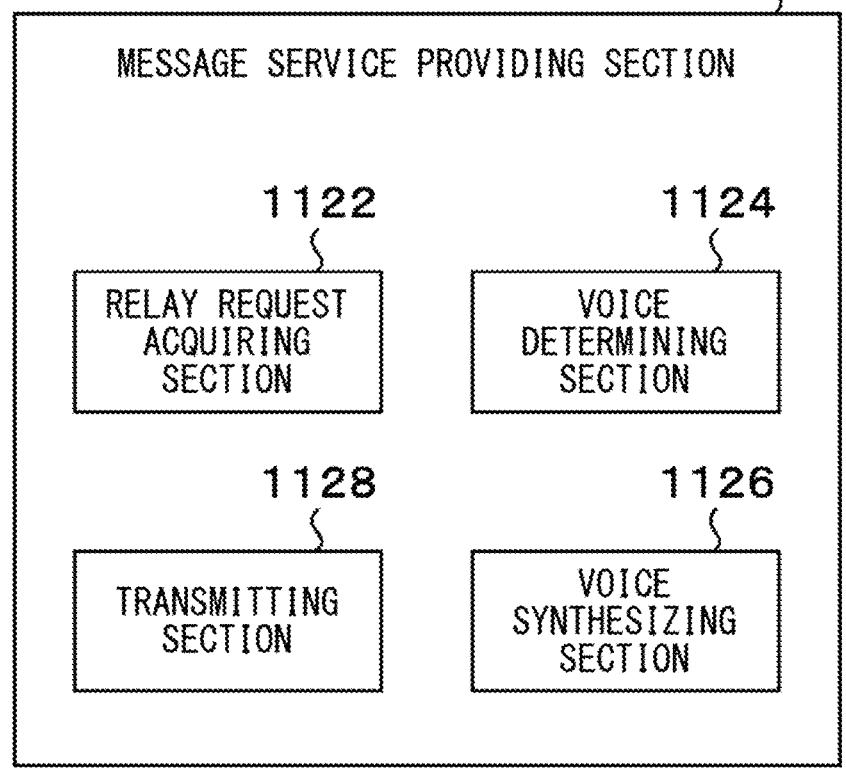
FIG. 11 schematically shows an example of an internal configuration of a message service providing section 850.

FIG. 11 schematically shows an example of an internal configuration of the message service providing section 850. In the present embodiment, the message service providing section 850 includes a relay request acquiring section 1122, a voice determining section 1124, a voice synthesizing section 1126, and a transmitting section 1128. The message service providing section 850 may have a similar configuration as the message managing section 660, as long as this does not cause a technical contradiction.

The voice synthesizing section 1126 may be an example of the voice message generating section. The transmitting section 1128 may be an example of the message transmitting section.

In the present embodiment, the relay request acquiring section 1122 acquires a relay request from the message managing section 660. In one embodiment, if the relay request is a request for the transmission of a voice message and the voice data of the voice message is present, the relay request acquiring section 1122 outputs this voice data to the transmitting section 1128. In this way, the voice message is transmitted to the communication terminal 30 of the user 20.

In another embodiment, if the relay request is a request for the generation and transmission of a voice message and information indicating the message content is present, the relay request acquiring section 1122 outputs to the voice determining section 1124 instructions for starting the process of determining the voice of the character in which this message is to be read. Furthermore, the relay request acquiring section 1122 outputs information indicating the content of the message to the voice synthesizing section 1126. The information indicating the content of the message may be a code or text indicating the content of the message or information indicating the type of the event.

In the present embodiment, the voice determining section 1124 acquires from the relay request acquiring section 1122 a command for starting the process of determining the voice of the character in which the message is to be read. The voice determining section 1124 receives this command, references the information stored in the setting information storage section 848, and acquires the information indicating the character set for the agent of the vehicle 110 by the user 20. Furthermore, the voice determining section 1124 acquires voice information of the voice of this character or information for specifying this voice information (e.g. a URI). The voice determining section 1124 outputs this information concerning the voice of the character to the voice synthesizing section 1126.

In the present embodiment, the voice synthesizing section 1126 acquires from the relay request acquiring section 1122 the information indicating the content of the message to be transmitted to the user 20. The voice synthesizing section 1126 acquires from the voice determining section 1124 the information concerning the voice of the character in which this message is to be read. The voice synthesizing section 1126 generates the voice message based on the information indicating the content of the message and the information concerning the voice of the character. The voice synthesizing section 1126 outputs the generated voice message to the transmitting section 1128.

In the present embodiment, the transmitting section 1128 transmits the voice message to the communication terminal 30 of the user 20. The transmitting section 1128 may transmit the voice message using various methods. The transmitting section 1128 may determine the transmission method of the voice message based on the determination of the message managing section 660.

In one embodiment, the transmitting section 1128 transmits the voice message to the communication terminal 30 using a voice communication service or an IP telephone service. In another embodiment, the transmitting section 1128 transmits the voice message to the communication terminal 30 as an electronic file of voice data, using a data communication service such as a mail service, social network service, messenger service, or the like.

Figure 12:
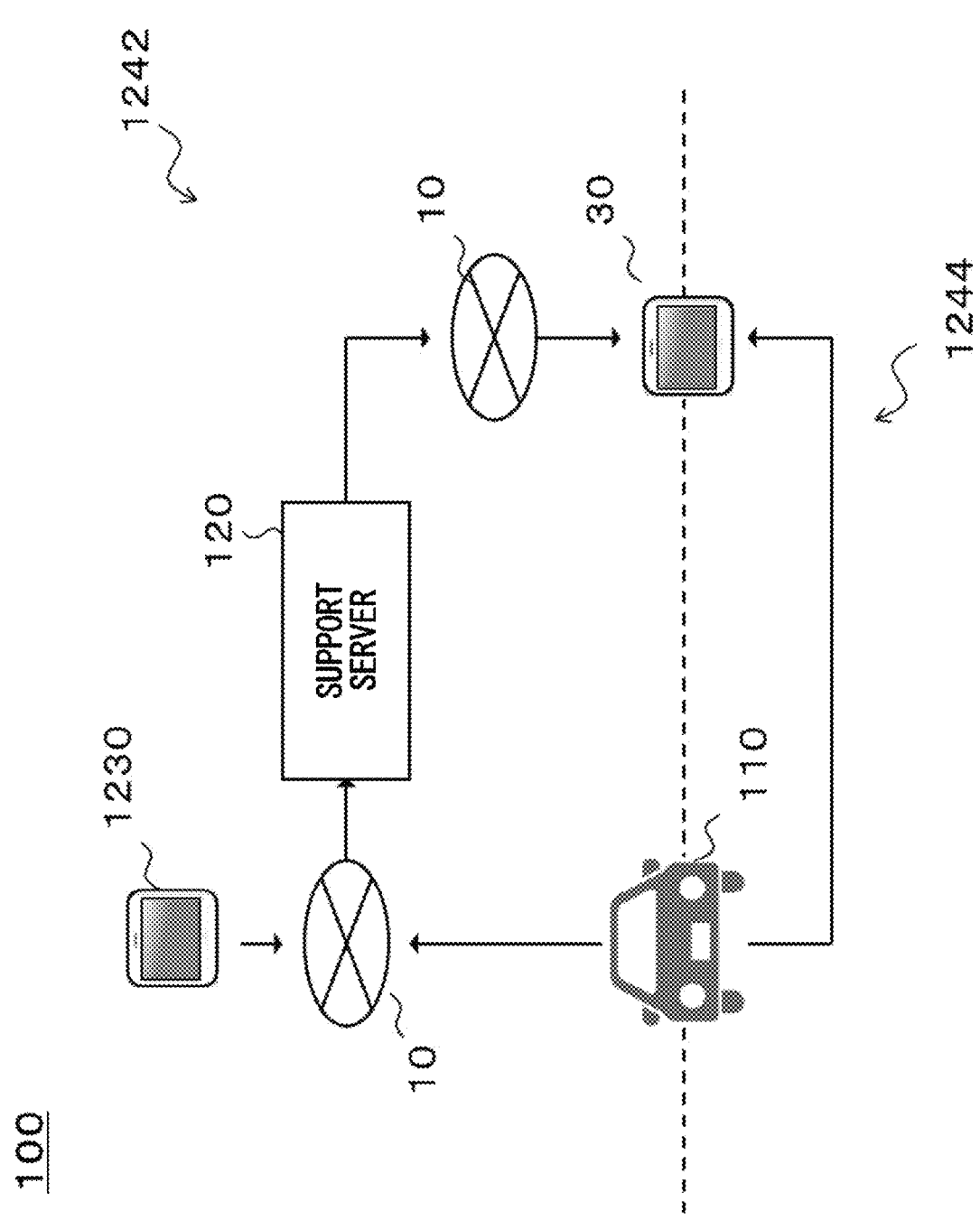
FIG. 12 schematically shows an example of a message service.

FIG. 12 schematically shows an example of a message service realized by the interactive agent system 100. According to one embodiment, the user of the message service (e.g. the user 20) can transmit a voice message from the vehicle 110 to the communication terminal 30 using a communication path 1242 that passes through the support server 120. In this way, the user of the message service can receive a message concerning the vehicle 110 in the voice of the agent set for the vehicle 110. According to another embodiment, this user can transmit a voice message from the vehicle 110 to the communication terminal 30 using a communication path 1244 established between the vehicle 110 and the communication terminal 30, without passing through the support server 120. In this way, the user of the message service can receive a message concerning the vehicle 110 in the voice of the agent set for the vehicle 110.

In the embodiments relating to FIGS. 1 to 11, the details of the interactive agent system 100 are described using an example of a case in which the response system 112 mounted in the vehicle 110 requests transmission of a voice message. However, the interactive agent system 100 is not limited to the present embodiment. In another embodiment, the user 20 may request the vehicle 110 or the support server 120 to transmit a voice message relating to the vehicle 110, using a communication terminal 1230 that is different from the vehicle 110.

For example, an application program for schedule management that has been introduced into the communication terminal 1230 detects a schedule concerning the vehicle 110. This program makes a request to the vehicle 110 or the support server 120 to transmit, to the communication terminal 30 of the user 20, a reminder concerning the detected plan, in the voice of the agent of the vehicle 110. In this way, the user of the message service can receive a message providing notification about the schedule concerning the vehicle 110 in the voice of the agent set for the vehicle 110.

Figure 13:
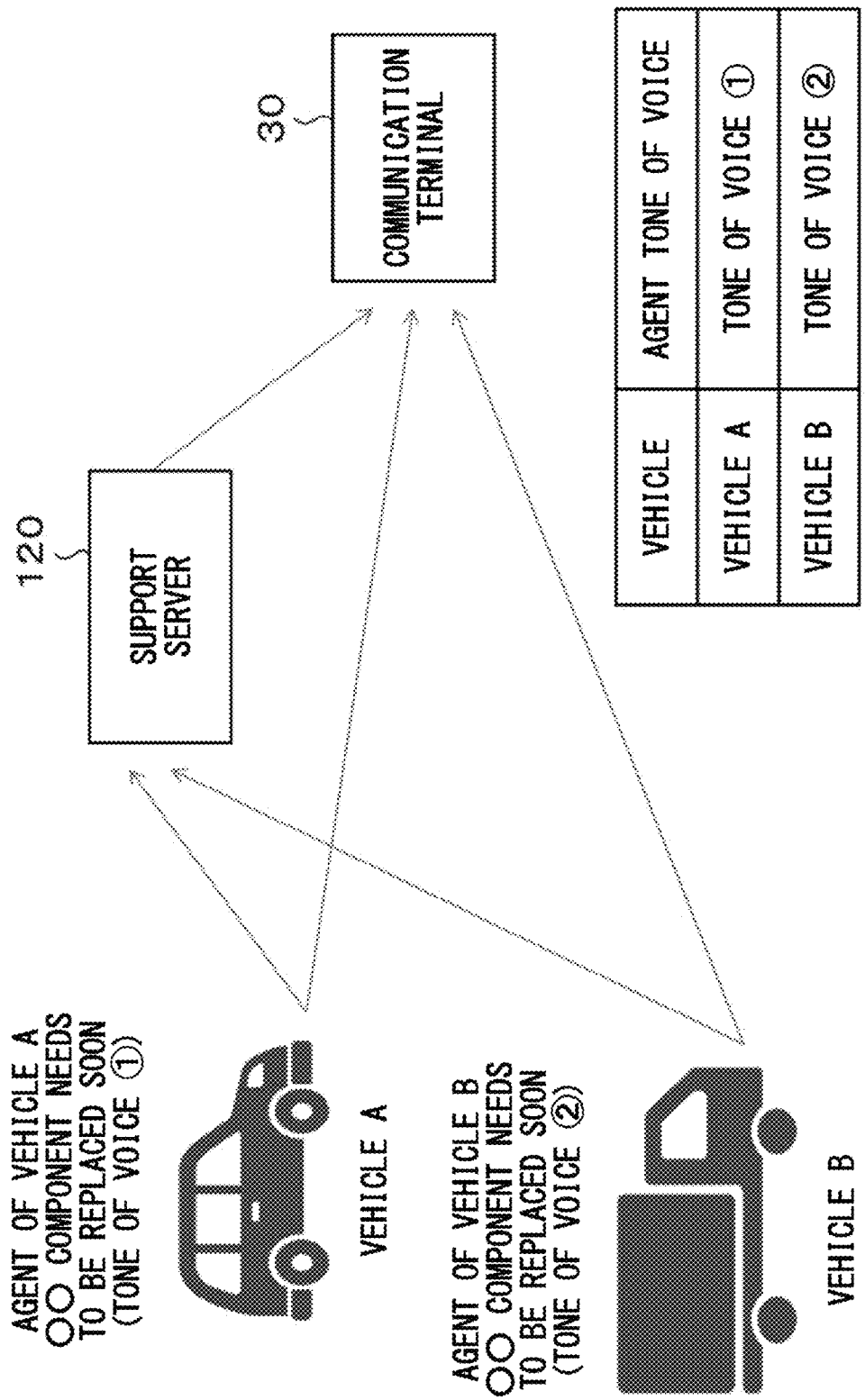
FIG. 13 shows an example of a conceptual diagram of the message service.

FIG. 13 schematically shows an example of a message service realized by the interactive agent system 100. According to the specific example shown in FIG. 13, a message concerning at least one of a vehicle A and a vehicle B is transmitted to the communication terminal 30 of the user 20. In the specific example shown in FIG. 13, the vehicle A and the vehicle B may be examples of the vehicle 110.

In one embodiment, the message concerning the vehicle A is transmitted from the support server 120 to the communication terminal 30 in response to a request from the vehicle A. In another embodiment, the message concerning the vehicle A is transmitted from the vehicle A to the communication terminal 30 using P2P communication. In these embodiments, the message concerning the vehicle A is output from the communication terminal 30 with a voice having tone of voice 1. Tone of voice 1 may be a tone of voice of the agent to be used or selected when the user 20 is using the vehicle A. In this way, the user 20 who hears the voice message can understand that this message is a message concerning the vehicle A.

Similarly, in one embodiment, the message concerning the vehicle B is transmitted from the support server 120 to the communication terminal 30 in response to a request from the vehicle B. In another embodiment, the message concerning the vehicle B is transmitted from the vehicle B to the communication terminal 30 using P2P communication. In these embodiments, the message concerning the vehicle B is output from the communication terminal 30 with a voice having tone of voice 2. Tone of voice 2 may be a tone of voice of the agent to be used or selected when the user 20 is using the vehicle B. In this way, the user 20 who hears the voice message can understand that this message is a message concerning the vehicle B.

While the embodiments of the present invention have been described, the technical scope of the invention is not limited to the above described embodiments. It is apparent to persons skilled in the art that various alterations and improvements can be added to the above-described embodiments. The features described in certain embodiments can be applied in other embodiments, as long as this does not result in a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: communication network, 20: user, 30: communication terminal, 100: interactive agent system, 110: vehicle, 112: response system, 114: communication system, 120: support server, 210: input section, 220: output section, 230: communicating section, 240: sensing section, 250: drive section, 260: accessory equipment, 270: control section, 272: input/output control section, 274: vehicle control section, 276: communication control section, 312: voice information acquiring section, 314: image information acquiring section, 316: manipulation information acquiring section, 318: vehicle information acquiring section, 322: communication information acquiring section, 330: transmitting section, 340: event detecting section, 350: response managing section, 360: agent information storage section, 412: line-of-sight measuring section, 414: calibrating section, 420: gaze point detecting section, 430: activation event detecting section, 440: user number detecting section, 450: message event detecting section, 520: eye contact detecting section, 530: activation phrase detecting section, 540: activation manipulation detection section, 620: transmission control section, 630: response determining section, 632: activation managing section, 638: response information acquiring section, 642: voice synthesizing section, 644: image generating section, 650: command generating section, 660: message managing section, 722: setting data storage section, 732: voice data storage section, 734: image data storage section, 820: communicating section, 830: communication control section, 840: request processing section, 842: request determining section, 844: executing section, 846: response information generating section, 848: setting information storage section, 850: message service providing section, 920: input information acquiring section, 932: voice recognizing section, 934: gesture recognizing section, 940: estimating section, 942: request estimating section, 944: user state estimating section, 946: vehicle state estimating section, 1034: response content determining section, 1036: response mode determining section, 1122: relay request acquiring section, 1124: voice determining section, 1126: voice synthesizing section, 1128: transmitting section, 1230: communication terminal, 1242: communication path, 1244: communication path

What is claimed is:

1. A control apparatus that controls an agent apparatus functioning as a user interface of a request processing apparatus that acquires a request indicated by at least one of a voice and a gesture of a user and performs a process corresponding to the request, the control apparatus comprising:
 a transmission event detecting section that detects an occurrence of an event necessitating transmission of a message to a communication terminal of the user;
 a transmission determining section that makes a determination to transmit a voice message to the communication terminal of the user, via a communication network, if an occurrence of the event is detected;

a content determining section that determines at least a portion of content of the message, based on a type of the event detected by the transmission event detecting section, a voice information storage section that stores voice information of a voice of each character of a plurality of agents to be used to transmit information to the user; and a voice message generating section that generates the voice message based on information indicating the content of the message determined by the content determining section and the voice information of the voice of the character stored in the voice information storage section.

2. The control apparatus according to claim 1, further comprising:

a request transmitting section that transmits a relay request requesting generation and transmission of the voice message to a relay apparatus that transmits the voice message to the communication terminal of the user, in response to a request from the agent apparatus, wherein the relay request includes information indicating the type of the event or content of the voice message, and the relay apparatus includes:

a user information storage section that stores (i) user identification information for identifying the user and (ii) voice information of a voice of a character of an agent to be used to transmit information to the user or information for specifying the voice information, in association with each other;

a voice message generating section that generates the voice message based on (i) information indicating the type of the event included in the relay request or information indicating the content of the voice message and (ii) the voice information of the voice of the character; and a message transmitting section that transmits the voice message to the communication terminal of the user.

3. The control apparatus according to claim 2, wherein the user information storage section stores (i) user identification information for identifying the user, (ii) device identification information for identifying the agent apparatus, and (iii) voice information of a voice of a character of an agent to be used by the agent apparatus to transmit information to the user or information for specifying the voice information, in association with each other.

4. An agent apparatus that functions as a user interface of a request processing apparatus that acquires a request indicated by at least one of a voice and a gesture of a user and performs a process corresponding to the request, the agent apparatus comprising:

the control apparatus according to claim 1.

5. The control apparatus according to claim 1, wherein the voice information of each character includes at least one of voice quality, voice tone, and voice pitch.

6. A non-transitory computer readable storage medium storing thereon a program that causes a computer to perform a control method for controlling an agent apparatus, wherein the agent apparatus functions as a user interface of a request processing apparatus that acquires a request indicated by at least one of a voice and a gesture of a user and performs a process corresponding to the request, and the control method comprises:

detecting an occurrence of an event necessitating transmission of a message to a communication terminal of the user; and making a determination to transmit a voice message to the communication terminal of the user, via a communication network, if an occurrence of the event is detected, determining at least a portion of content of the message, based on a type of the detected event, storing voice information of a voice of each character of a plurality of agents to be used to transmit information to the user; and generating the voice message based on information indicating the content of the determined message and the voice information of the voice of the character stored in the voice information storing.

7. A control method for controlling an agent apparatus, wherein the agent apparatus functions as a user interface of a request processing apparatus that acquires a request indicated by at least one of a voice and a gesture of a user and performs a process corresponding to the request, the control method comprises:

detecting an occurrence of an event necessitating transmission of a message to a communication terminal of the user; and making a determination to transmit a voice message to the communication terminal of the user, via a communication network, if an occurrence of the event is detected, determining at least a portion of content of the message, based on a type of the detected event, storing voice information of a voice of each character of a plurality of agents to be used to transmit information to the user; and generating the voice message based on information indicating the content of the determined message and the voice information of the voice of the character stored in the voice information storing.

* * * * *